Dec. 8, 1953 E. J. LOMAZZO ET AL 2,661,579
BELT DRESSING AND CUTTING DEVICE
Filed Sept. 6, 1949 11 Sheets-Sheet 5

INVENTORS.
EDMUND J. LOMAZZO
BY LLOYD E. MAQUAT

John Hanrahan
ATTORNEY

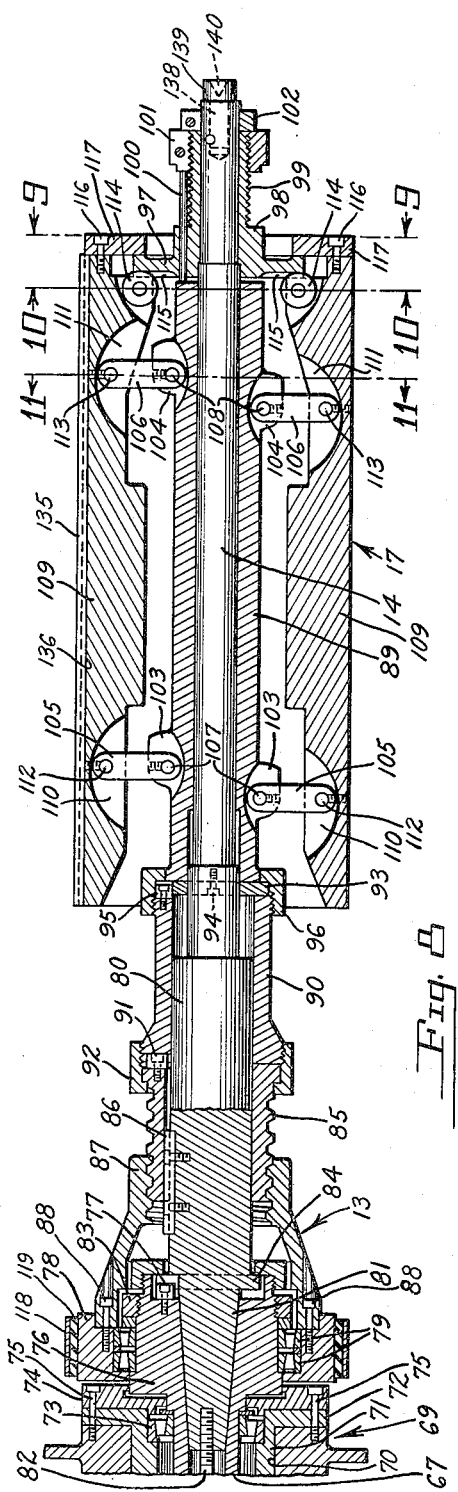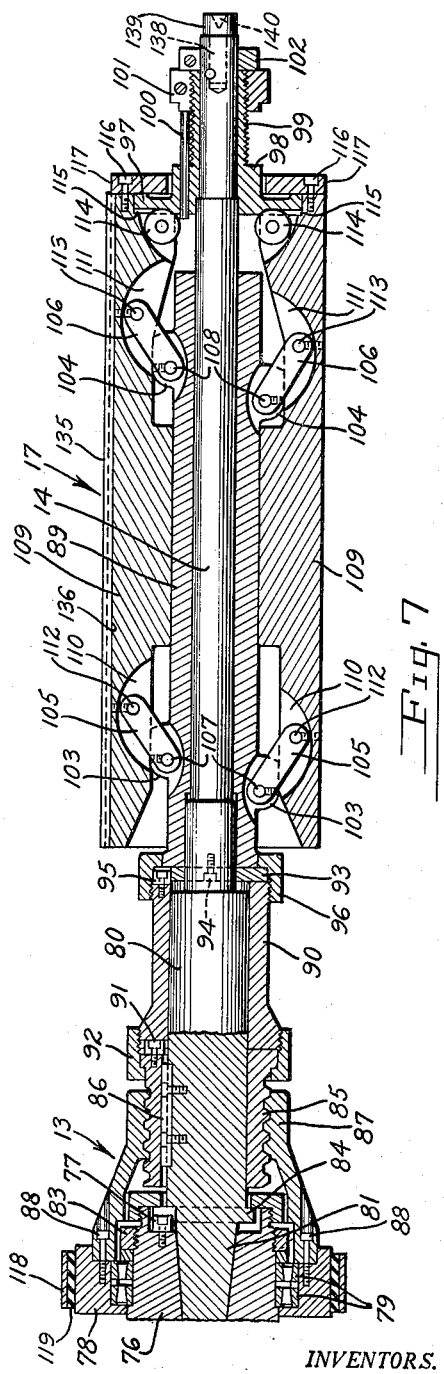

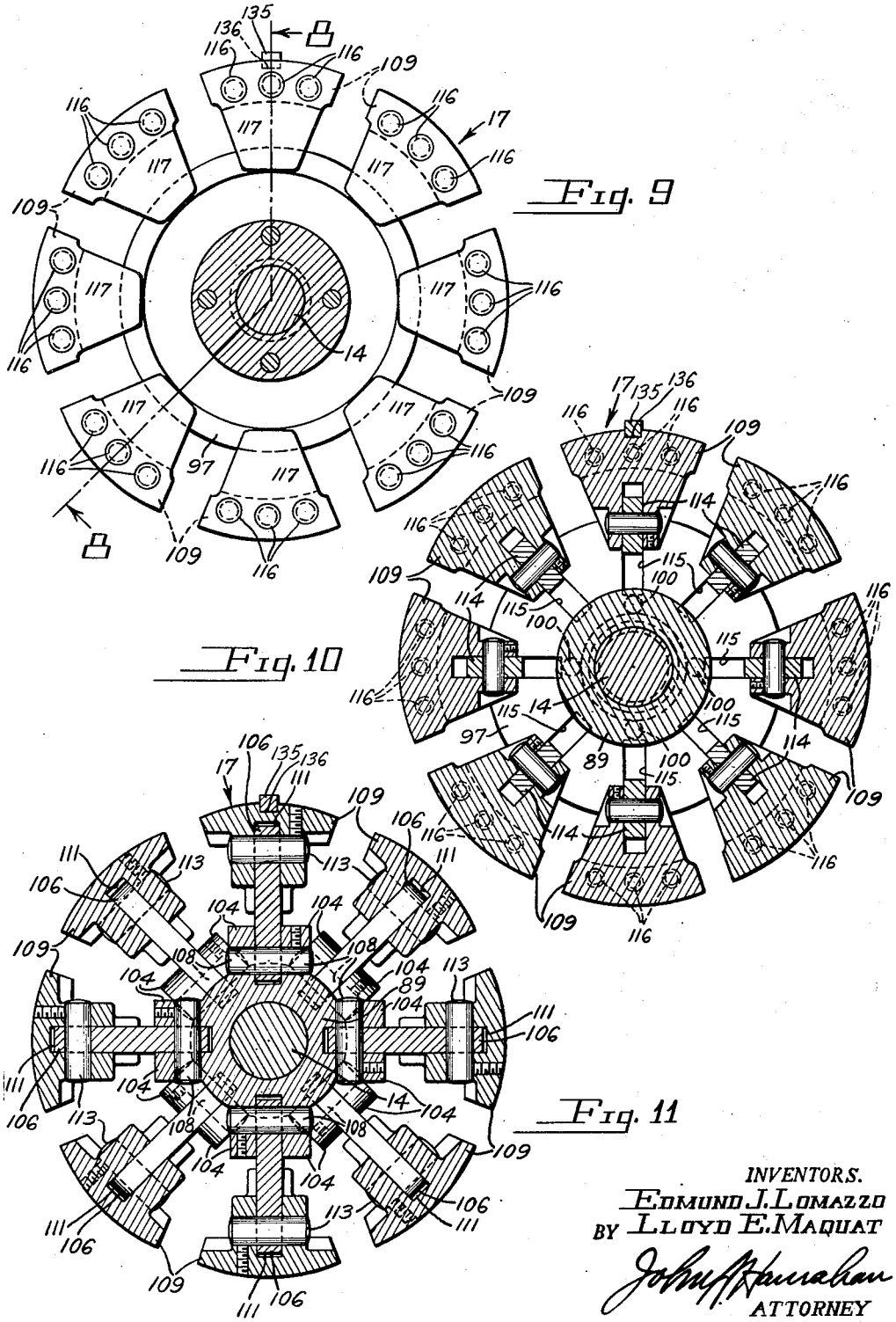

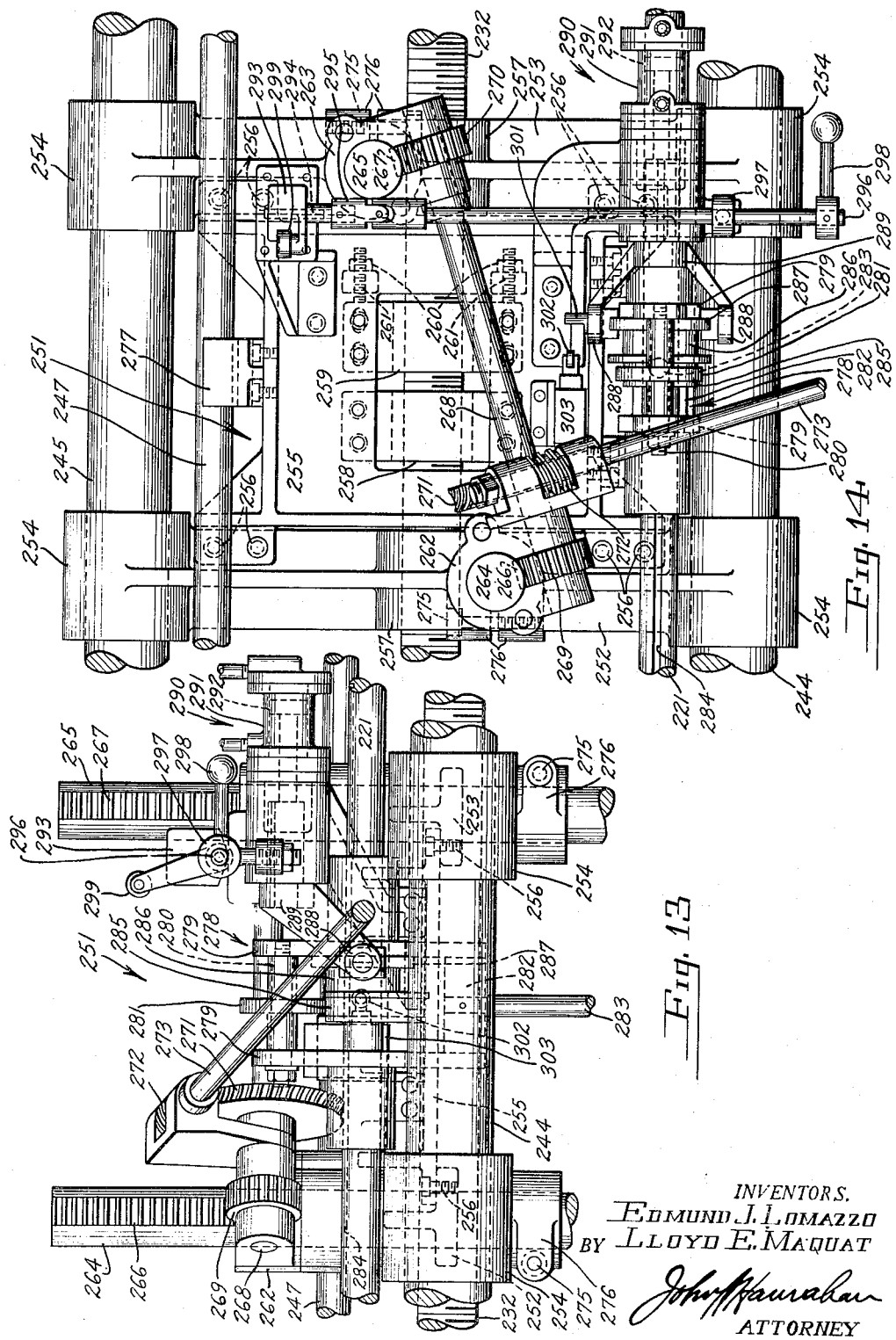

Dec. 8, 1953   E. J. LOMAZZO ET AL   2,661,579
BELT DRESSING AND CUTTING DEVICE
Filed Sept. 6, 1949   11 Sheets-Sheet 10

INVENTORS.
EDMUND J. LOMAZZO
BY LLOYD E. MAQUAT

ATTORNEY

Dec. 8, 1953 E. J. LOMAZZO ET AL 2,661,579
BELT DRESSING AND CUTTING DEVICE
Filed Sept. 6, 1949 11 Sheets-Sheet 11

INVENTORS.
EDMUND J. LOMAZZO
BY LLOYD E. MAQUAT

John H. Hanrahan
ATTORNEY

Patented Dec. 8, 1953

2,661,579

UNITED STATES PATENT OFFICE 2,661,579

BELT DRESSING AND CUTTING DEVICE

Edmund J. Lomazzo, Norwalk, and Lloyd E. Maquat, Easton, Conn., assignors, by mesne assignments, to The Dayton Rubber Company, Dayton, Ohio, a corporation of Ohio Application September 6, 1949, Serial No. 114,154

31 Claims. (Cl. 51—5)

This invention relates to new and useful improvements in production machinery and has particular relation to a machine for cutting belts from a cylinder or a cylindrical sleeve of belt stock.

An object of the invention is to provide a machine of the character described, which is adapted for rapid production of V-belts or straight-sided belts with a minimum of manual effort.

Another object is to provide a belt cutting machine including an expansible and collapsible mandrel mounting a cushioning sleeve over which work is to be disposed, means being provided for dressing said cushioning sleeve to a cylindrical form and of exact dimension in the expanded condition of the mandrel, there being locating means on the mandrel and sleeve for insuring the identical relationship between such parts on re-expansion of the mandrel following its collapse.

A further object is to provide a V-belt cutting machine including a head stock, a work supporting mandrel supported from one end and driven by said head stock, a tail stock supporting the other end of said mandrel, guide ways above said mandrel, a pair of cutting units supported from and movable as a single unit along said guide ways, means for moving said units to and from cutting relation with work on said mandrel and for indexing said units along said guide ways longitudinally of said mandrel, and means for swinging said tail stock from a position aligned with and supporting the outer end of said mandrel to an inoperative position laterally of the latter whereby stock may be placed on and work removed from said mandrel over said outer end thereof.

Another object is to provide in a machine of the character indicated an improved construction of cutter unit.

A further object is to provide in a machine of the character described, an improved cam knockout means for retracting the cutters from and advancing them toward the work and stock respectively.

Yet another object is to provide a machine of the character described wherein the cutters having completed their intermittent movement across the work to cut the same are automatically locked out of the work and may be given a continuous rapid traverse return movement to their starting position, at which latter position they remain until a clutch is thrown.

Other objects and advantages of the invention will become apparent from a consideration of the following detailed description taken in connection with the accompanying drawings wherein a satisfactory embodiment of the invention is shown. However, it is to be understood that the invention is not limited to the details disclosed but includes all such variations and modifications as fall within the spirit of the invention and the scope of the appended claims.

In the drawings:

Fig. 7 is a longitudinal sectional view through an expansible and collapsible mandrel showing the same in collapsed condition;

Fig. 8 is a view somewhat similar to Fig. 7, but showing the mandrel in expanded condition, the view being taken as along the plane of the line 8—8 of Fig. 9;

Fig. 9 is a sectional view taken along the line 9—9 of Fig. 8 and looking in the direction of the arrows;

Fig. 10 is a sectional view taken along the line 10—10 of Fig. 8 and looking in the direction of the arrows;

Fig. 11 is a sectional view taken as along the line 11—11 of Fig. 8 looking in the direction of the arrows;

Fig. 13 is a detailed enlarged front elevational view of a carrier means, the view being taken as looking from the forward side in Fig. 14;

Fig. 14 is a top plan view of the means of Fig. 13;

Figure 1:
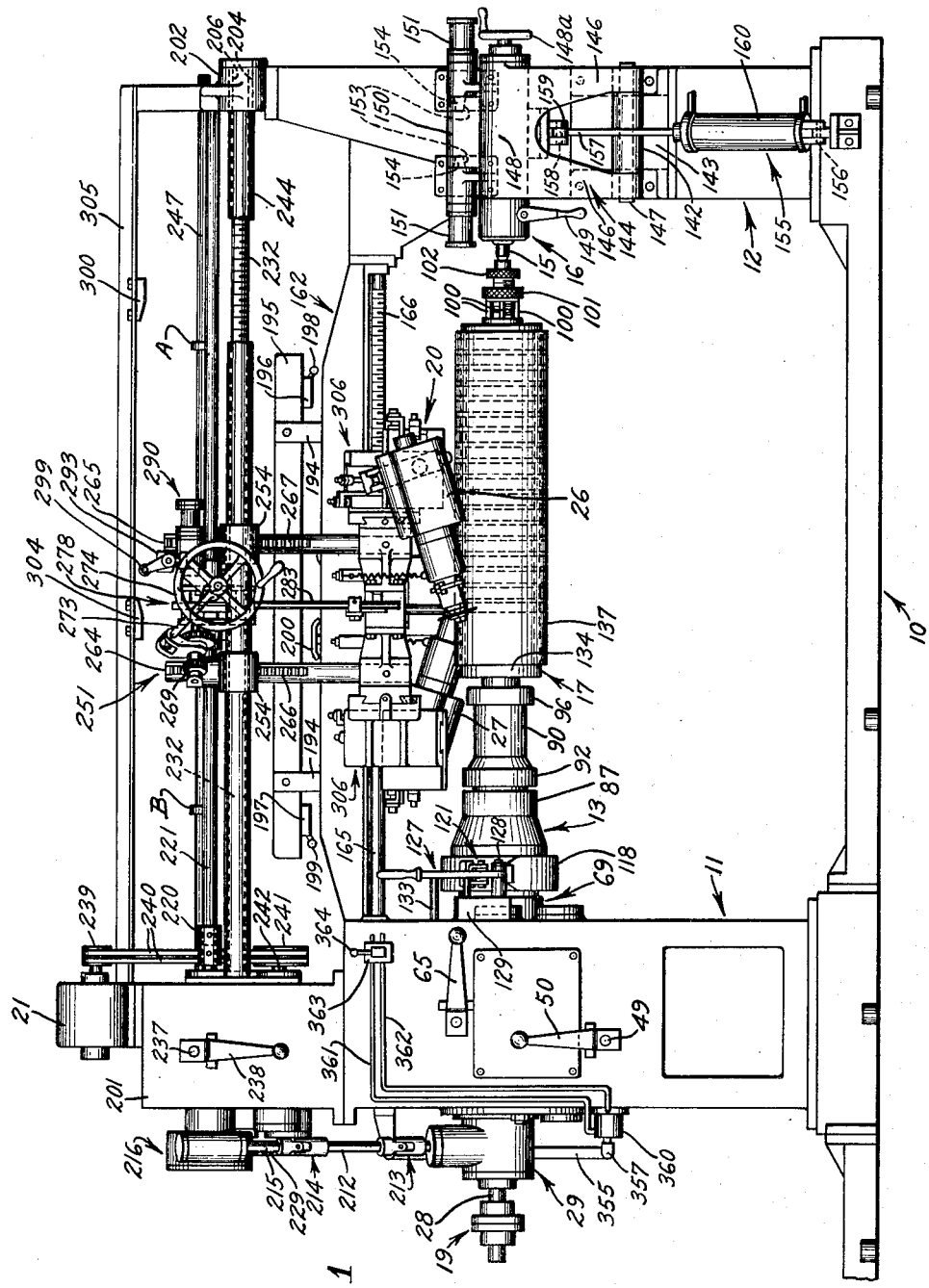
Fig. 1 is a front elevational view showing a machine constructed in accordance with the present invention.

Referring in detail to the drawings, at 10 is generally indicated the base of our machine, said base at one end mounting a gear housing, generally designated 11, and at its other end mounting an end frame member, generally designated 12. Through means within the upright gear housing 11, and which means is later to be described, a head 13 at one side of said housing and spaced substantially above the base 10 is driven and this head supports the inner end of a mandrel mounting spindle 14 (see particularly Figs. 7 and 8) and at the proper time rotates such spindle.

The outer end of the spindle 14, when the machine is in use, is supported and centered on a tail stock center 15 mounted by a tail stock generally designated 16, and at such times the spindle is supporting an expansible and collapsible mandrel, generally designated 17. This mandrel is designed to receive a cushioning sleeve over which is placed a piece of work in the form of a relatively heavy cylinder of a laminated construction including fabric and rubber designed to be cut into short sections, by the present machine, whereby to provide belts. As the composition of the piece of work in the form of a cylinder is partly of fabric, it will be understood that the cut belts will be of fixed length and relatively non-stretchable.

The present machine provides a means whereby the mentioned cylindrical sleeve of work will be cut into a series of short lengths of equal width. While the machine provides for the use of an expansible and collapsible mandrel over which is placed the cushioning sleeve, the machine also includes means whereby such cushioning sleeve will be dressed to a true cylindrical form by means generally designated 18 and located at the rear of the machine. Such true cylindrical form of cushioning sleeve is necessary for the reception of the work piece in the form of a cylinder to the end that the belts cut from such work piece will have linear edges. Further, the machine provides for the automatic cutting of the work piece into belts of equal widths and the general purpose of the machine is the rapid production of drive belts and generally of V-belts, although the machine is not necessarily limited to the production of V-belts but may be used for the production of transversely rectangular belts.

The present machine is powered preferably from an electric motor (not shown) through a change speed gearing (not shown), such source of power being used to drive a coupling 19. This coupling, through suitable mechanism later to be described, may be used for expanding and collapsing and driving or rotating the mandrel 17. Also, this coupling operates through a drive to be described for intermittently feeding the cutter mechanism, generally designated 20, outwardly from the head 13 and longitudinally with respect to the mandrel 17, during the cutting of a work piece into belts.

A small electric motor 21 provides for a rapid traverse or quick return of the cutter mechanism 20 following the operation of cutting a sleeve or piece of work into a plurality of belts. A second small electric motor 22 comprising a part of the dressing mechanism 18, provides the power for rotating a grinding wheel 23 forming part of such dressing mechanism. The cutter device 20 includes a pair of cutting knives 24 and 25 and independent motors 26 and 27 for driving such knives, all as will later be pointed out in detail.

The coupling 19 serves to drive a shaft 28 passing through a bearing housing 29 mounted on the outer side of the wall 30 of gear housing 11 and then passes into and across the gear housing 11, being suitably mounted in bearings 31 and 32 carried by the walls 30 and 33 of the housing 11. Inwardly of the housing wall 30, a dual gear including a large diameter gear 34 and a smaller diameter gear 35 is keyed or otherwise fixedly secured to the shaft 28. Then, spaced inwardly along the shaft, a relatively small gear 36 is keyed or otherwise fixedly secured thereto. At the inner side of gear 36 a dual gear, including a large diameter gear 37 and a smaller diameter gear 38, is mounted on a sleeve or otherwise whereby it is freely turnable about the shaft 28 as an axis. A tubular sleeve or filler 39 extending between the gear 38 and bearing 32, properly locates the gears 37 and 38 on the shaft 28.

In parallel relation with the shaft 28 and also within the gear housing 11 is a shaft 40 journalled at its respective ends in bearings 41 and 42 carried by the housing walls 30 and 33. Freely turnable on this shaft 40 is a gear 43 adapted to be selectively connected with the shaft by a clutch element 44. Such clutch element 44 is part of a clutch structure generally designated 45 and which, in addition to the element 44, includes an element 46, a shifter 47, a yoke 48 for operating such shifter and a bar or rod 49 fixed to the yoke and extending to the front side of the machine and there being fixed to a hand lever or manual 50.

On the shaft 40 and beyond the clutch 45, is a second gear 51 turnable about the shaft 40 as an axis but adapted to be selectively connected or coupled with the shaft through the clutch element 46. Then, beyond such relatively large gear 51 there is a smaller gear 52 keyed directly to the shaft 40. A stub shaft 53 mounts an intermediate or reversing gear 54 in a position laterally of the gears 35 and 43 but in mesh with such gears whereby to establish a drive between them.

Rearwardly of the shaft 28, but in substantially horizontal alignment therewith, a shaft 55 extends across the gear housing 11 and is journalled in bearings 56 and 57. Shaft 55 has turnably mounted thereon a gear 58 adapted to be selectively coupled with the shaft through a clutch element 59 comprising part of a clutch structure generally designated 60, and also including a clutch element 61. The clutch elements 59 and 61 are selectively rendered operative on the shifting of a collar or shifter 62 by means of a yoke 63 fixed to a shaft 64 which extends at the forward side of the machine and there has fixed to it a lever or manual 65.

Turnable about the shaft 55 as an axis and located on said shaft inwardly of the clutch element 61, is a relatively large diameter gear 66 adapted to be selectively coupled with shaft 55 by the clutch element 61. It is shaft 55 which, through connections later to be described, serves to drive the mandrel spindle 14 and thus to expand or collapse the mandrel 17 or to provide the necessary power for the driving or rotating of this mandrel during a cutting operation.

With the gearing described, the drive of the shaft 55 may be in one direction or the other to expand or collapse the mandrel and then there is a substantially straight line drive for rotating the mandrel during a working operation. In the expanding and collapsing of the mandrel, a brake mechanism is used, which brake mechanism will later be described in detail, but here it is thought best to include a description of the manner in which the gearing already described may be employed for driving the mandrel.

It is intended that the shaft 28 shall be continuously driven during any period of use of the machine. If the mandrel is to be either collapsed or expanded, but assuming that it is to be collapsed, the drive is from shaft 28 through gear 35 to gear 54 to gear 43 which is now coupled with the shaft 40 through the clutch element 44. Shaft 40 being driven, it through gear 52 drives the gear 37 and the latter being integral with gear 38, such gear 38 is driven and drives the gear 66 which is now coupled with the shaft 55 through the clutch element 61 whereby shaft 55 and thus the mandrel spindle 14 is rotated in one direction. At this time, the brake means above referred to is applied to hold a part or drum against rotation and the mandrel is collapsed.

In the collapsed condition of the mandrel, the belts are removed and a new piece of work applied to the mandrel and then the latter must be expanded. To accomplish this, the operator manipulates clutch 45 to disconnect gear 43 from the shaft 40 and to couple the gear 51 with the shaft 40. Clutch 60 may stay in the position already described, through its element 61 coupling the gear 66 to shaft 55. Now the drive avoids the intermediate or reversing gear 54 and is from shaft 28 through gear 36 to gear 51. The latter gear being coupled with the shaft 40 through the element 46, shaft 40 is driven and through gear 52 drives gear 37 and thereby gear 38. The latter meshing with gear 66, shaft 55 is driven in the opposite direction to that first described. At this time, the mentioned brake being again applied to prevent rotation of the drum, the mandrel will be expanded as will later more fully appear.

When the mandrel spindle 14 is to be driven so as to rotate the mandrel during the operation of cutting belts from a piece of stock, the drive is again from shaft 28. At this time, the drive is through gear 34 to gear 58 which is mounted on the shaft 55. Now the clutch 45 is in neutral position, but the clutch 60 is shifted so as to have its element 59 couple the gear 58 directly with the shaft 55 whereby the latter is substantially directly driven and, of course, serves to drive the mandrel spindle 14.

Fixed to rotate with the shaft 55 is a tubular shaft or sleeve 67, which parts may be integral. Check nuts 68 at the inner side of wall 33 restrain outward movement of this structure. Sleeve 67 extends into the driving head 13 and comprises the means by which motion is transmitted to the driving head from the shaft 55. A bearing member 69 mounted by the housing wall 33 supports the tubular shaft 67. Within an opening 70 through the means 69 (see Figs. 7 and 8) there is mounted a sleeve 71 having a laterally extending flange 72 at its outer end, and this sleeve toward such outer end mounts anti-friction bearings 73 for the hollow shaft or spindle 67. A plate 74 assists in maintaining these bearings in place and the plate and the sleeve member 71 are secured to the means 69 by bolts 75. Shown integral with the outer end of the hollow spindle 67 is an inner head-like portion 76 at its forward end carrying lugs or keys 77.

Mounted on this head-like portion, but adapted to be held against turning movement therewith, is a drum 78 mounted as on anti-friction bearings 79. Toward its inner end, the spindle 14 includes a substanatially cylindrical portion 80 and inwardly of such portion a tapered or cone portion 81, the latter being received in a similarly shaped opening through the inner head 76. A rod 82 may be connected with the inner end of the spindle and such rod will be provided with suitable means whereby the spindle will be drawn tight into the cone-shaped socket provided in the inner head 76.

A nut 83 may be threaded to the head 76 to keep the bearings 79 in place. Fixed to the spindle 14 at about the juncture of its portions 80 and 81, or formed integral with the spindle at this point, is a collar 84 having sockets or openings therein. In number, such sockets or openings equal the number of the keys 77 fixed to the forward side of the inner head 76 and are adapted to receive these keys. With this construction, it will be apparent that as the inner head 76 is rotated, the spindle 14 must rotate with it, being made fast to it for the purpose of rotation by means of the keys 77 entering the openings or sockets in the collar 84.

An externally threaded sleeve 85 is disposed over the cylindrical portion 80 of the spindle 14 and is secured thereto for turning movement therewith, and for sliding movement in the direction of the length thereof, by an elongated key 86. Threaded onto this sleeve is a nut 87 having its inner end made fast to the drum 78 by screws or bolts 88. The mandrel 17 is mounted on the spindle 14 and (see Figs. 7 and 8) it is here noted that this mandrel includes an inner sleeve 89 mounted on the spindle 14 to turn therewith and also for limited movement longitudinally thereof.

Located between the inner end of sleeve 89 and the outer end of the threaded sleeve 85 is a tubular adaptor or extension 90. On the outer end of the externally threaded sleeve 85, keys 91 are secured and these keys are received in sockets or recesses formed in the inner end of the adaptor 90. Also, a tubular nut 92 is designed to turn about the outer end portion of the externally threaded sleeve 85 and to be threaded onto the inner end portion of the adaptor 90 whereby to couple these parts. Such coupling so locates the parts that the keys 91 rigid with the sleeve 85 are located in recesses in the adaptor 90 whereby any turning movement of the sleeve 85 is transmitted to the adaptor 90.

A disc 93 is fixed to the inner end of the mandrel sleeve 89 as by screws 94 and a suitable number of keys 95 are fixed to the outer end of the adaptor 90. The disc 93 has a number of recesses or notches equal to the number of keys 95 and, in the assembly, such notches receive such keys. Then, a nut 96 turnable about the inner end of the mandrel sleeve 89, is threaded on the outer end of the adaptor 90 coupling these parts and securing them in relation, with said keys 95 entering notches or recesses in the disc. With this construction, any turning movement of the adaptor 90 is necessarily imparted to the mandrel sleeve 89. Further, it will be seen that on turning of the nut 96 to release it from the outer end of the adaptor 90, there is no connection between the mandrel 17 and any portion of the head 13 and thus the mandrel may be moved outwardly along the spindle 14. Here it is noted that such a disconnection is made when a larger or smaller mandrel is to be substituted for the one then on the machine.

In addition to the sleeve 89, the mandrel 17 includes an annular plate or disc 97 having a hub portion 98 and integral with such hub portion there is an outwardly extending reduced diameter externally threaded sleeve 99. One or more elongated pins 100 pass through the hub portion 98 and may slide back and forth therethrough. Threaded on the sleeve 99 is a stop device in the form of a collar 101, and such collar is adapted to be adjusted along the sleeve to limit the extent to which the pin or pins 100 may be pushed outwardly through the hub portion 98. A nut 102 is clamped on the outer end portion of the spindle 14 in a position against the outer end of the externally threaded sleeve 99 whereby such sleeve and the entire mandrel 17 is held against movement outwardly longitudinally of the spindle 14.

At suitably spaced points, the sleeve 89 is provided with inner and outer sets of lugs 103 and 104. The number of sets of lugs employed will depend on the number of segments in any particular mandrel. The lugs of each set are arranged radially about the sleeve 89 and each lug of the inner set is measured along the length of the sleeve, aligned with or in the same plane with its corresponding lug in the outer set. Measured transversely of the sleeve, the alternate lugs of the inner set and the alternate lugs of the outer set are slightly offset with respect to one another so that transversely the alternate lugs of the outer set of lugs are in slightly different planes and the same is true of the lugs of the inner set. It is noted that such an arrangement permits of making an expansible and collapsible mandrel having an exceptionally large number of segments.

Sets of inner and outer links 105 and 106, all of the same length, are employed and each link 105 at its inner end is secured by means of a pin 107 with a pair of the lugs 103 while each link 106 at its inner end is secured by means of a pin 108 with a pair of the lugs 104. These pins pivotally attach the inner ends of the links to the sleeve 89. A series of segments 109 are provided, each having an arcuate outer surface, all segments having their outer surface on an arc of a circle. Each segment is also provided with inner and outer sets of lugs 110 and 111 and pins 112 secure the outer ends of the links 105 with the lugs 110, while similar pins 113 secure the outer ends of the links 106 with the lugs 111. With the described construction, it will be seen that through the links 105 and 106 the segments 109 are connected with the sleeve 89, but there may be relative radial movement between the segments and the sleeve 89 as the links 105 and 106 swing on their pivots or on their pivotal connections with the sleeve and the segments.

Toward its outer end, each segment 109 carries a roller 114 and these rollers are adapted to travel in radially extending guide slots 115 (see Fig. 10) in the inner face of the disc 97. Similarly, screws 116 attach to the outer end of each segment 109 a lug 117 and these lugs are radially arranged and each extends inwardly and overlaps the outer face or side of the disc 97. Since the rollers 114 bear against the inner surfaces of the slots 115 of the disc 97 and the lugs 117 bear against the outer face of said disc and these parts are rigid with the respective segments 109, it will be understood that such segments are secured against movements in the directions of their lengths by the disc 97 but may move radially outwardly and inwardly with respect to said disc. Thus, the mandrel 17 may be expanded from the collapsed position of Fig. 7 to the expanded condition of Fig. 8 and from such expanded to such collapsed condition.

Figures 5, 6:
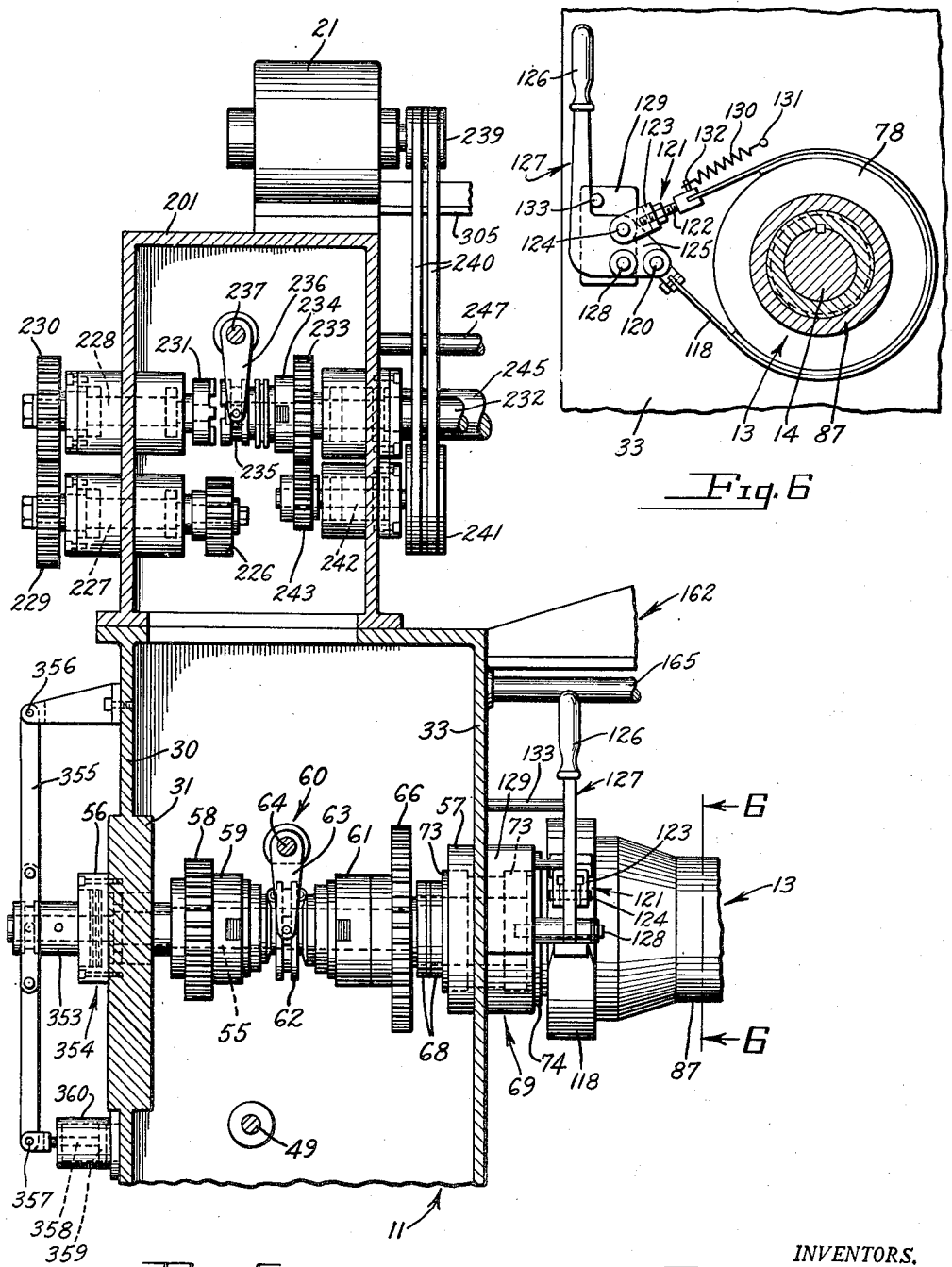
Fig. 5 is a similar view taken along the line 5—5 of Fig. 3.
Fig. 6 is a detail sectional view showing a braking means, the view being taken as along the line 6—6 of Fig. 5.

A brake band 118 having a suitable friction lining 119 has one end anchored as on a pivot or pin 120 (see Fig. 6) and is carried about the drum 78 and has its other end fixed to a connector 121 including an adjustable threaded rod 122. This connector 121 also includes a bifurcated portion or fork 123 connected by a pivot 124 with a lever including a short arm 125 and a longer arm 126 comprising a handle. The mentioned lever, which is here generally designated 127, is pivoted at 128 on a bracket 129 fixed to the outer side of the wall 33 of the gear housing 11.

A coil spring 130 is anchored at one end as to a pin 131 rigid with the wall 33 and at its other end is anchored to a pin 132 forming part of the connector 121. At 133 there is a pin fast with the bracket 129 and acting as a stop to limit clockwise movement of the lever 127 about its pivot 128. Clearly, the spring 130 is constantly under tension and is trying to maintain the lever 127 in the position of Fig. 6 with the brake released from the drum 78. Also, it will be clear from Fig. 6 that on manual rocking of the lever 127 in a counter clockwise direction, the brake band 118 will be tightened to tighten the friction lining 119 against the drum 78 whereby to frictionally hold the latter against turning movement.

Assuming the mandrel to be collapsed as in Fig. 7, a cushioning sleeve comprising a sleeve or heavy hollow cylinder 134 of rubber is slipped over the mandrel from its outer end, the tail stock 16 being in open position, as will be described. For the purpose of maintaining this cushioning cylinder 134 in the same relation to the segments of the mandrel on re-expansion of the latter following its collapse from a once expanded position with the cushioning sleeve thereon, at least one segment 109 of the mandrel is provided with a key. In the drawing, such key is designated 135 and is shown as extending longitudinally of a mandrel segment 109 and for substantially the length of such segment.

Figure 16:
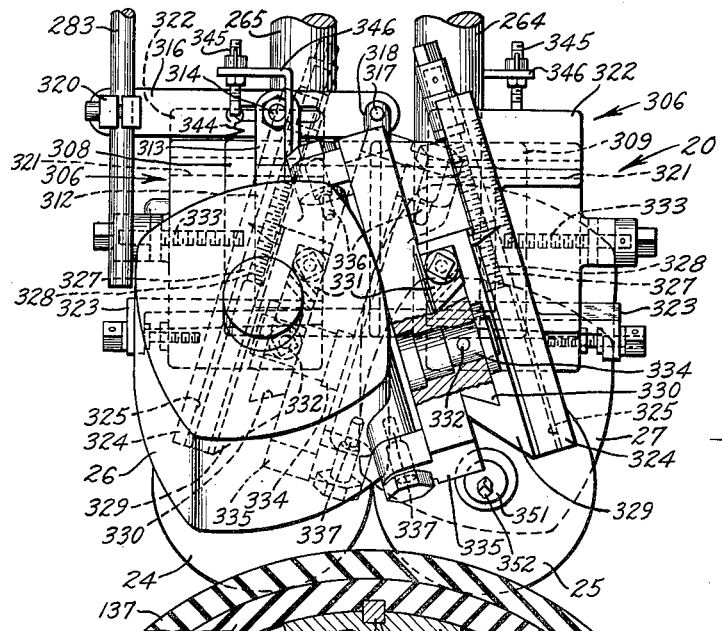
Fig. 16 is an end elevational view looking as from the right in Fig. 15.
Figure 17:
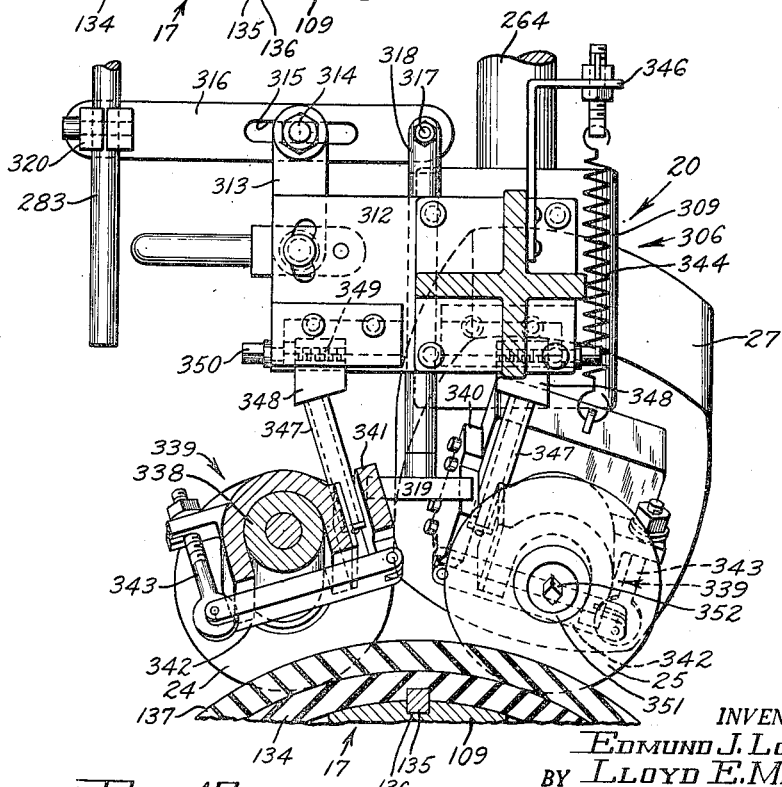
Fig. 17 is a further enlarged view, the same being a detail sectional view taken as along the line 17—17 of Fig. 15.

In placing the cushioning sleeve 134 on the collapsed mandrel, a groove or keyway 136 (Figs. 16 and 17) in such sleeve is aligned with and receives the key 135. After the cushioning sleeve 134 is in position on the collapsed mandrel, then a piece of work 137 is placed over such sleeve 134, the piece of work 137 comprising a cylinder of rubber or comprising a laminated structure including rubber, cloth and the like. This piece of work will be slipped over the sleeve 134 from the outer or tail stock end of the mandrel, the tail stock being then in an open or out-of-the-way position.

The cushioning sleeve and the work piece being on the collapsed mandrel, the operator manipulates the lever or handle 50 to operate the clutch 45 and engage its element 46 so as to couple the gear 51 to the shaft 40. Also, he then manipulates the handle or lever 65 to have the clutch 60 couple the gear 66 to the shaft 55 and thus to the tubular shaft 67. The clutches being coupled as described, the drive is from the shaft 28 through gear 36 to gear 51 which is now coupled with the shaft 40 by the clutch element 46. Further, the drive is through gear 52, which is keyed to shaft 40, to gear 37 and hence to gear 38, which gears are turnable about shaft 28, to the gear 66 which is coupled with the shaft 55 through the clutch element 61. Consequently, the hollow spindle or shaft 67 and thus the inher head 76 and the spindle 14 are being driven. At this time, the operator is grasping the brake handle 126 and applying the brake to the drum 78 and thus the latter is being frictionally held against turning movement with the head 76 and the spindle 14 and the externally threaded sleeve 85.

Since the drum 78 is held against turning movement with the other parts, the nut 87 being secured to said drum by the bolts 88 is held against turning movement and the sleeve 85 being fixed to the spindle portion 90 by the key 86 is threaded outwardly with respect to the nut 87. As this occurs, said sleeve being connected with the adaptor 90 and thus with the sleeve 89 of the mandrel, the latter sleeve is shifted outwardly as from the position of Fig. 7 to or toward the position of Fig. 8. As the sleeve 89 is fed outwardly along spindle 14, the sets of links 105 and 106 have a thrust applied to them which they transmit to the segments 109.

Because of the engagement of the rollers 114 with the inner surface of the plate or disc 97, the segments cannot move in the directions of their lengths and so the thrust applied to them through the links results in their moving outwardly radially with respect to the sleeve 89 or in a direction to increase the effective diameter of the mandrel. The diameter to which the mandrel is to be expanded is known and depends on the work in hand and, accordingly, the stop 101 has previously been adjusted on the threaded tubular portion 99. Therefore, as the sleeve 89 is fed by the threaded sleeve 85 screwing itself out of the nut 87, the forward end of the sleeve 89 strikes the inner ends of the pins 100 and these pins may move outwardly until they engage the stop 101. When this occurs, it is merely necessary that the operator release the brake handle whereupon nut 87 and drum 78 are rotated with other portions of the head and mandrel and there will be no further attempt to expand the latter.

After work on the mandrel has been cut into belts, it is then desirable to collapse the mandrel whereby to reduce its effective diameter and permit of the work being more readily removed from the mandrel. In this connection, it will be understood that after a piece of work has been placed on the mandrel, the latter is expanded to forcefully engage the cushioning sleeve 134 and expand the latter to forcefully engage it with the inner surface of the cylindrical work piece 137 whereby to slightly expand the same or at least put a tension on the work piece. The purpose of the cushioning sleeve is to protect the cutter knives 24 and 25 as they cut through the work piece 137 in operation of the machine, the cushioning sleeve preventing said knives from coming into direct engagement with the metal mandrel segments.

To collapse the mandrel to permit of easier removal of the cut work piece from the sleeve 134, the levers 59 and 65 are returned to or shifted to positions such that the clutch element 46 is disconnected from the gear 51 and the clutch element 44 is coupling the gear 43 to the shaft 49. At this time, the lever 65 is in position to have the clutch 60 functioning as previously described, that is, serving to couple the gear 66 with the shaft 55 through the clutch element 61. Thus, the gear 66 is coupled to drive the hollow shaft 67 and the driving head 13, as has previously been set forth.

Now the drive from the shaft 28 is through gear 35 to the reversing gear 54 and thence to the gear 43 which, being coupled with shaft 49, drives the latter and through gear 52 keyed thereto and meshing with the large gear 37, drives the small gear 38 and thence the large gear 66 which is coupled with the shaft 55 by the clutch element 61. Owing to the use of the intermediate or reversing gear 54, the mandrel will now be rotated in the opposite direction. At this time, the operator grasps the brake handle 126 applying the brake to the drum head 78 thereby holding the nut 87 against revolving with the threaded sleeve 85. However, this sleeve continues to revolve or turn with the spindle 14 and the inner head 76 and thus the sleeve 85 is fed or threaded inwardly into the nut 87.

Through the coupling nuts 92 and 96, the sleeve 85 is connected with the sleeve 89 of the mandrel and thus such latter sleeve will be drawn inwardly moving the inner ends of the sets of links 105 and 106 toward the left from the position of Fig. 8 and toward the positions in which the links are shown in Fig. 7. Such movement results in a pull being transmitted through the links to the segments 109 but owing to the fact that the lug 117 are rigid with the forward ends of these segments and that such lugs overlap the outer end or side of the plate 97, the bars can have no longitudinal movement in the direction of this pull. Therefore, the mentioned pull or draw transmitted through the links 105 and 106 resolves itself into a movement drawing the segments 109 radially inwardly toward the sleeve 89 reducing the effective diameter of the mandrel.

At this time, the cut work or product is removed from the cushioning sleeve 134 and a new piece, a cylinder, of work is disposed over the cushioning sleeve and then the mandrel is again expanded by the drive first described above. In this connection, it will be understood that so long as the work is of the same size, the stop 101 is left in position and during the expanding of the mandrel, the operator does not have to keep measuring the mandrel or work to see if proper expansion of the mandrel and thus of the work has been obtained.

When the sleeve 89 pushes the pins 100 hard against the stop 101, the mandrel is expanded to the desired extent and cannot be further expanded. At this time, in order to hold the drum 78 and nut 87 stationary, a very considerable pull on the brake lever or handle 126 is required and the operator knows that proper expansion has been obtained even though he does not look to the position of the pins 100 at the outer end of the mandrel. He therefore merely releases the brake lever knowing that the desired expansion has been obtained.

At its outer end, the spindle 14 is centered and supported on the center 15 of the tail stock 16. To prevent wear in the spindle 14 (see Figs. 7 and 8) the latter does not bear directly on the tail stock center 15 but is bored in its outer end to receive the stem 138 of a bearing head 139 having a tapered socket 140 in its outer end to receive the cone point of the tail stock center 15. Should the socket 140 wear, then the head 139 is replaced by withdrawing its stem from the outer end of the spindle 14 and mounting a new head on the outer end of such spindle.

Figure 2:
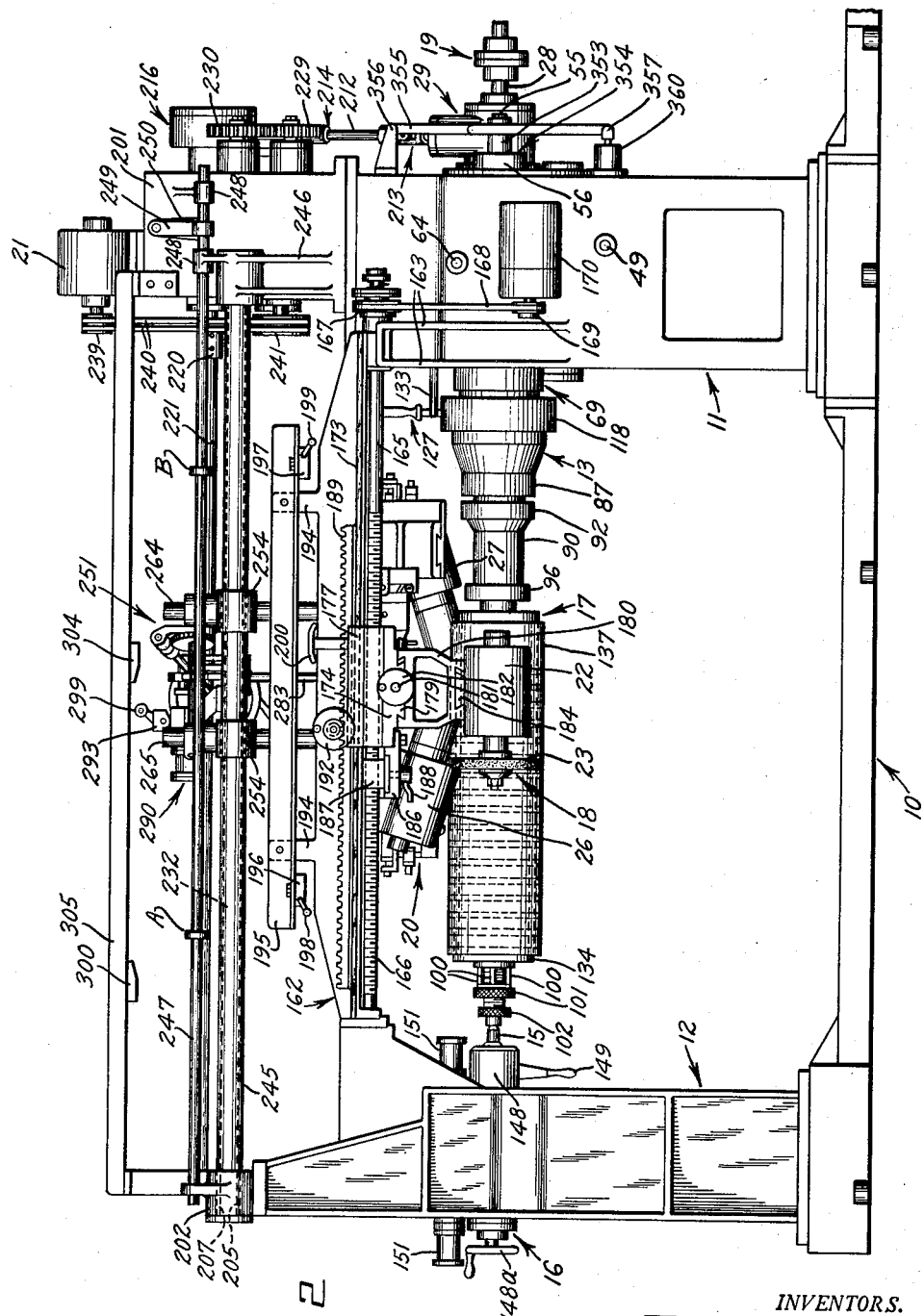
Fig. 2 is a rear elevational view of such a machine.

Tail stock 16 (see Figs. 1, 2 and 12) is mounted by the upright frame portion 12 which is shown as secured to the base 10 as by bolts 141. This upright is provided in its forward side and intermediate its ends with a bracket 142 having an outwardly projecting central ear portion 143.

Figure 12:
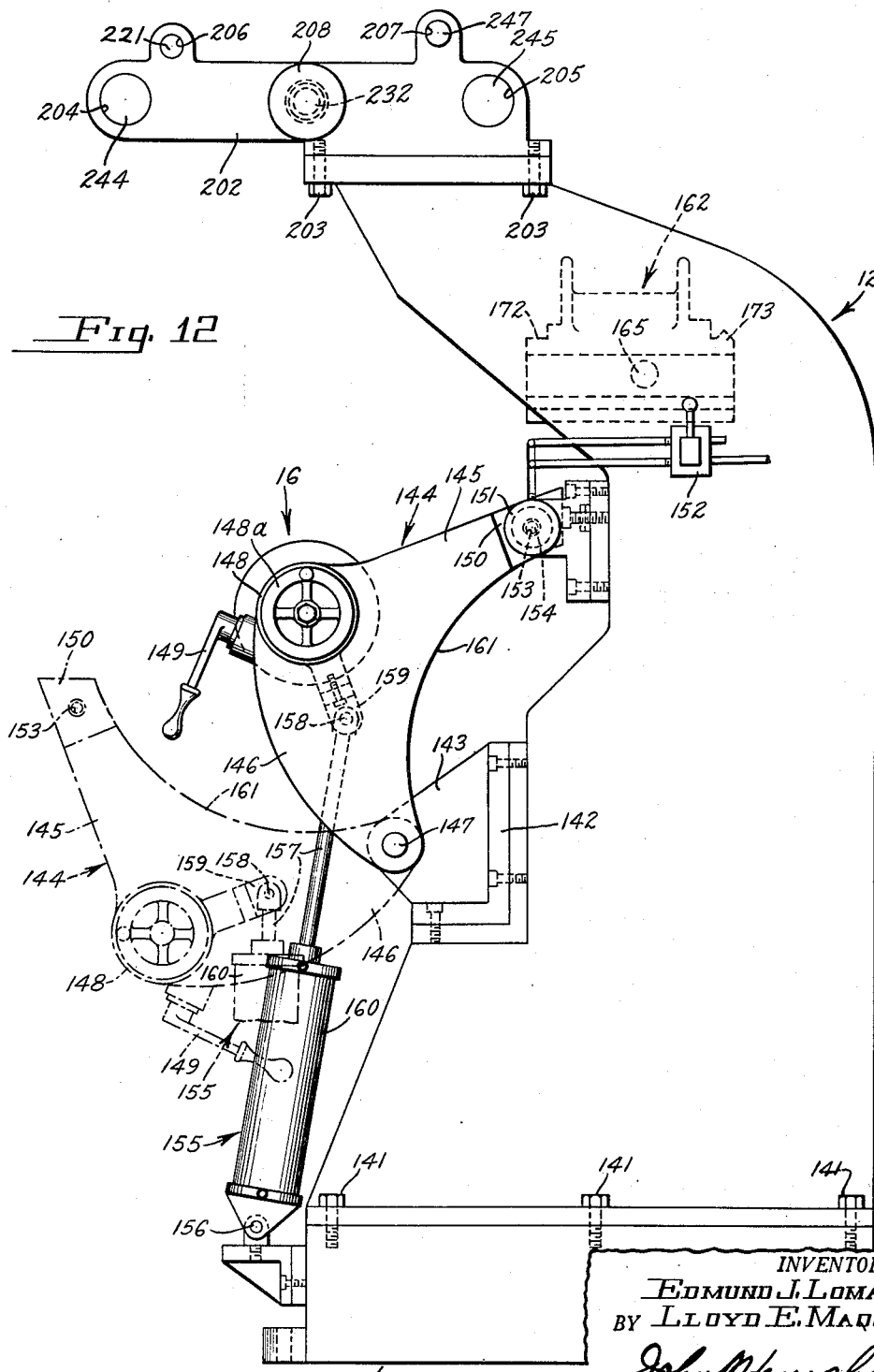
Fig. 12 is an end elevational view of the machine, the view being taken as looking from the right in Fig. 1, the tail stock being shown by broken lines in an open position.
Figure 15:
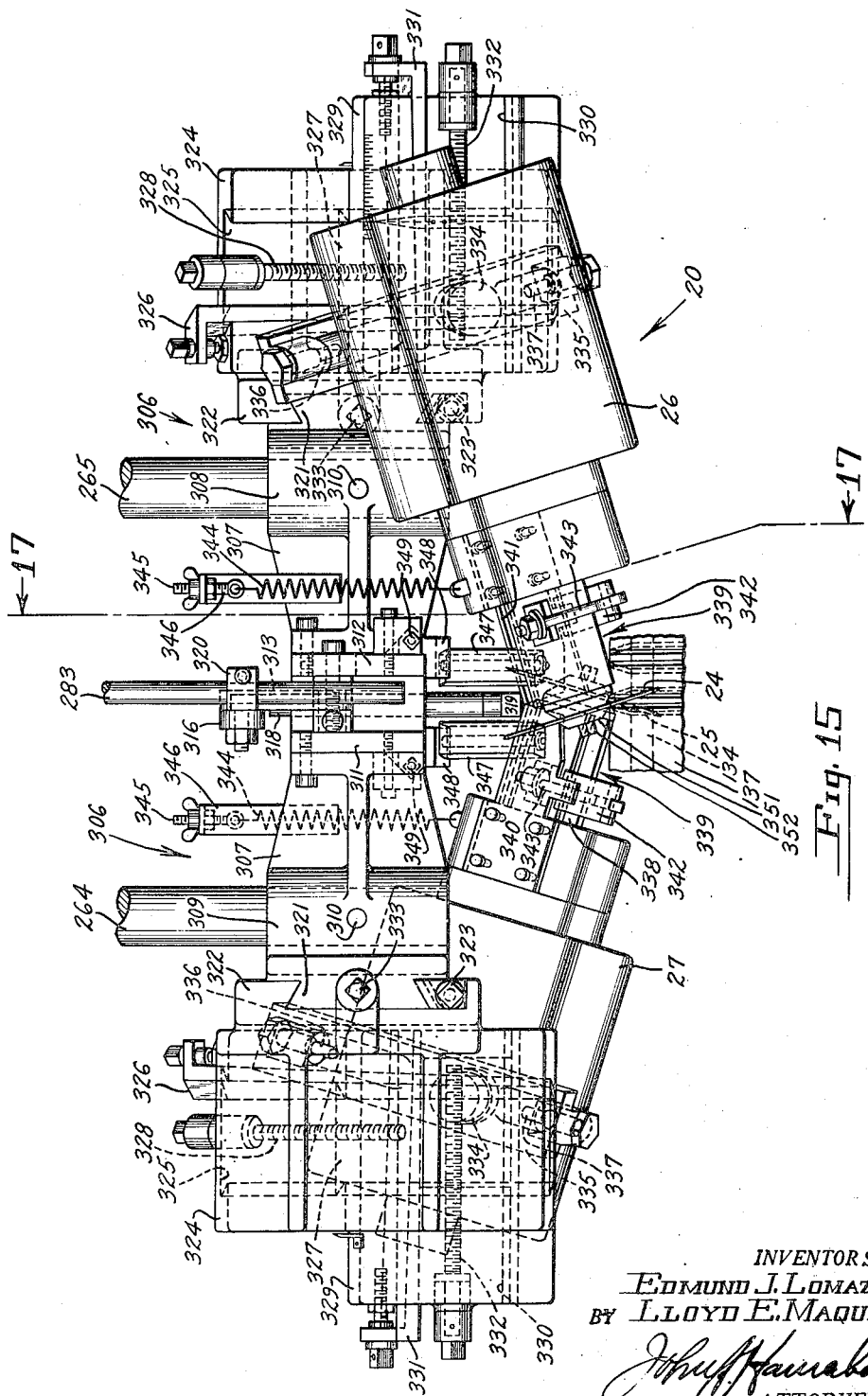
Fig. 15 is an enlarged front elevational view of the cutter mechanism.

The tail stock includes a body 144 made up generally of a pair of arms 145 and 146, the latter being a bifurcated construction and at its lower end turnable on or with a pivot member or shaft 147 passing through the ear 143 and which may be either rigid with the ear or rigid with the bifurcated arm portions 146 whereby body 144 is pivoted for movement as from the operative full line position of Fig. 12 to the machine loading broken line position of that figure.

The body 144 at the juncture of its arms 145 and 146 is provided with a cylindrical construction 148 which mounts the tail stock center 15 for longitudinal adjustment, such adjustment being controlled as by a hand wheel 148a and the spindle being locked in its projected or retracted position through manipulation of a hand piece 149.

Arm 145 has an end portion 150 which, in the operative position of the tail stock, enters between the adjacent portions of a pair of cylinders 151. This portion 150 has sockets 153 opening through its outer sides and the cylinders 151 mount bolts 154 for projection into such sockets 153 to lock the body 144 in its operative position and which bolts are adapted to be withdrawn from such sockets to permit of the body being swung to the broken line position of Fig. 12. Preferably, the sockets 153 and bolts 154 are slightly tapered so as not only to lock the body 144 in its operative position but also to insure proper location of the body. The supply of fluid under pressure to the cylinders 151 is controlled by a hand valve 152 mounted on the machine end frame 12 (see Fig. 12).

It will be appreciated that the tail stock 16 is of heavy construction and power means are provided for swinging it between its operative and inoperative positions, as between the full and broken line positions of Fig. 12. Such power means includes a cylinder and piston construction generally designated 155. Of this construction, the cylinder 160 at its lower end is pivotally mounted at 156 and the piston rod 157 extending through the upper end of the cylinder is pivoted at 158 to a short arm or section 159 projecting from the underside of the cylindrical portion 148 of the tailstock but rigid with the latter. On fluid, as air, under pressure being admitted to the upper end portion of the cylinder 160, the locking and centering bolts 154 being withdrawn from the portion 150, the tail stock will be swung from the full to the broken line position of Fig. 12. Preferably, opening of the tail stock opens a control switch (not shown) shutting off power to all the motors, including the motors 26 and 27.

It is noted that the body 144 has an arcuate side 161 and when the body is in the open position of Fig. 12, such arcuate surface 161 is concentric with the mandrel 17 or the mandrel spindle 14 and so certain sizes of work may be disposed on this arcuate surface and then pushed onto the mandrel over the cushioning sleeve 134. The work having been pushed on the mandrel, the fluid under pressure will be then exhausted from the upper end portion of the cylinder 160 and will be supplied to the lower end portion of the latter forcing the piston rod 157 back upwardly to the full line position of Fig. 12 and returning the tail stock to its operative position. Now the bolts 154 will be advanced into sockets 153 locking the tail stock in place and the wheel 148a may be operated to advance the tail stock spindle 15 to operative position, in which latter position the tail stock spindle may be locked by manipulation of the handle 149.

When, during use of the machine, a cushioning cylinder 134 becomes so damaged by being cut as to not have further useful life, then in such instance the damaged sleeve is removed and a new sleeve applied. The new sleeve is applied while the mandrel is collapsed and its segments have their adjacent longitudinal edges relatively close together. Then, when the mandrel is expanded, the longitudinal edges of its segments are further spaced apart and are applying a pressure to the cushioning sleeve so that the latter develops slight flats in its portions which are not directly supported by the mandrel segments. If permitted to remain, these flats would be transmitted to a cylinder of work about the sleeve and then, as belts are cut, their edges will be wobbly or uneven and will not be curvilinear as is desired. That is, a belt cut under the mentioned conditions will not be of uniform width between its side edges throughout its length.

To avoid this, we have provided a dressing mechanism generally designated 18 above and including the motor 22 and the grinding wheel 23. This dressing mechanism is mounted on or by a bridge-like supporting structure 162 located at the upper rear side of the machine and at one end is supported as by bracket 163 while its other end is supported by frame piece 12. Extending along at the underside of the bridge 162 is a shaft 165 having a threaded portion 166 forming a feed screw for the feeding of the dressing mechanism longitudinally of the machine. This shaft is equipped with a pulley 167 driven as by a belt 168 also trained over a pulley 169 on the shaft of a small motor 170 fastened as by bolts 171 to the rear wall of the gear housing 11.

Figure 3:
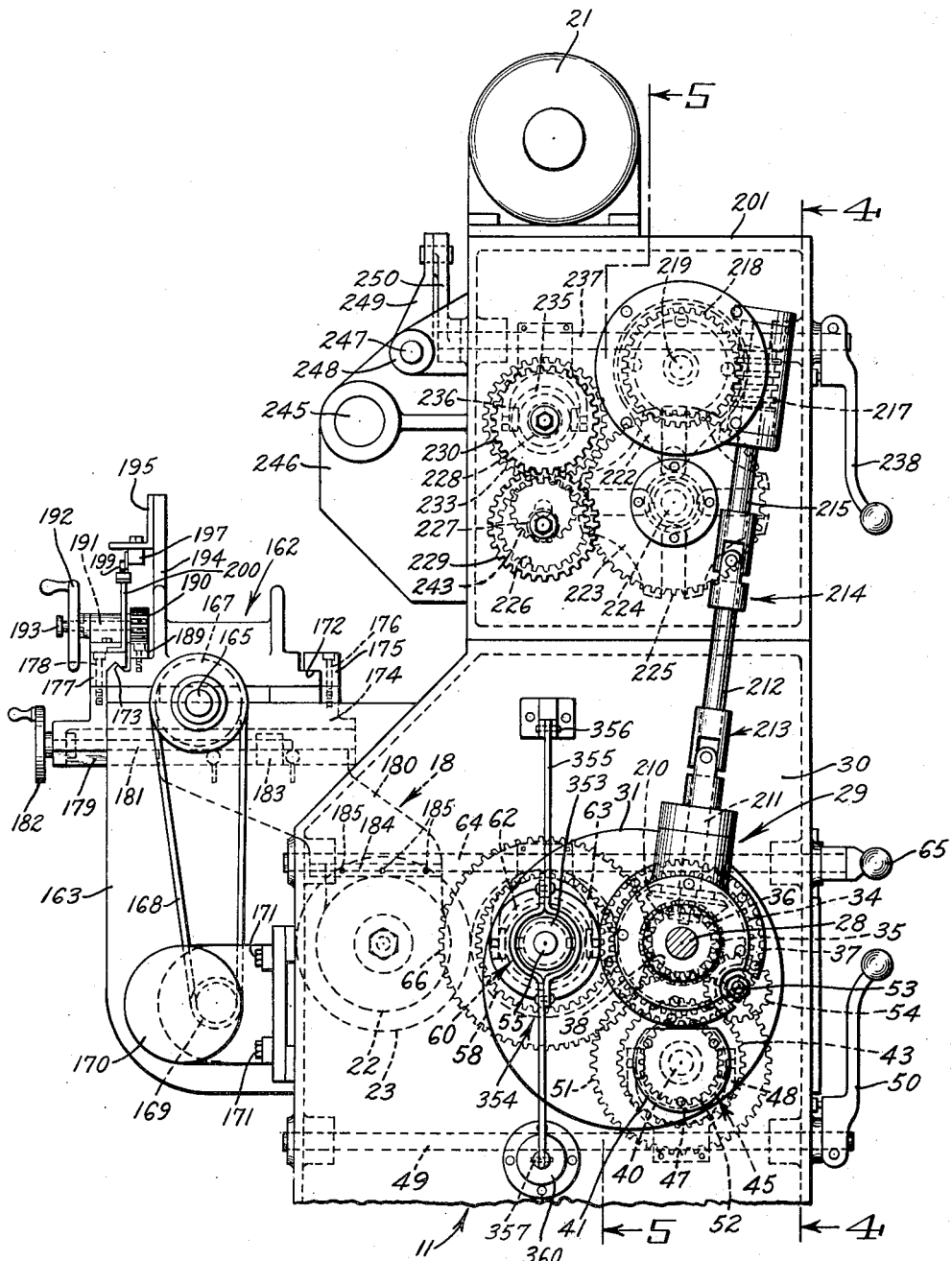
Fig. 3 is an end elevational view of the machine, taken as looking from the left in Fig. 1.
Figure 4:
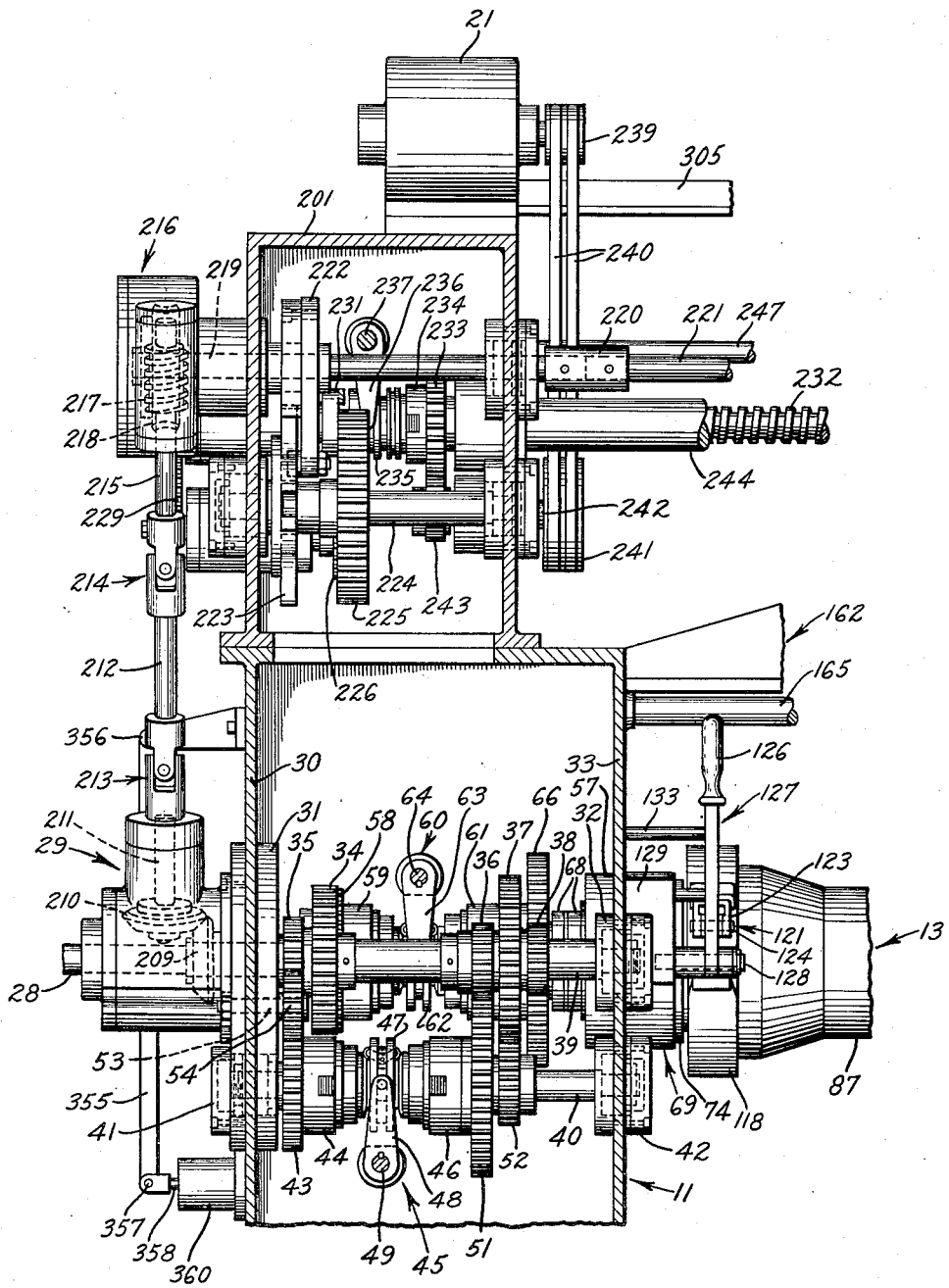
Fig. 4 is a vertical sectional view taken along the line 4—4 of Fig. 3.

The bridge 162, at its rear edge, includes a flat rail-like portion 172 (see Fig. 3) and at its front upper edge includes a V-rail 173. At the underside of the bridge is a mounting plate 174 which is supported from the bridge by means of an inverted L-shaped suspension piece 175 bolted to the mounting plate by a bolt 176 overlying the flat rail 172 and by a second inverted L-shaped suspension piece 177 secured to the forward side of the mounting plate as by bolts 178 and having a way receiving the upper side of the V-rail 173. In this way mounting plate 174 is suspended from the bridge 162 but is adapted for guided movement longitudinally of the bridge.

At its underside, a mounting plate 174 has a dovetail projection 179 received in the dovetail way in the upper side of a bracket 180. A screw 181 in the supporting plate 174 is mounted for turning movement only and is adapted to be turned by a hand wheel 182. This screw is threaded through a nut 183 fast with the bracket 180 whereby on rotation of the screw the bracket will be fed in a direction transversely of the machine, either inwardly or outwardly thereof. This bracket 180 extends forwardly into the machine, as best shown by the dotted lines in Fig. 3, and in its lower end is provided with a way receiving a dovetail slide or key 184 fast with the motor 22 and by which the motor is mounted. Screws or other fastening means 185 are provided for locking the key on slide 184 in the desired position in the dovetail channel provided in the lower end of the bracket 180.

A member 186 is movable with the supporting member 174 and at its upper side carries a split nut construction 187 adapted on manipulation of the hand piece 188 to be engaged with or disengaged from the threaded shaft portion 166. When this split nut 187 is engaged with said threaded portion of the shaft, it will be clear that as the shaft is rotated in one direction or the other, the entire dressing device 18 will be moved longitudinally of the machine in one direction or the other.

On the upper side of the bridge 162, toward the forward edge of the latter, there is secured a rack 189 with which engages a gear wheel 190 on the inner end of the shaft 191, while on the outer end of such shaft is a hand wheel 192 adapted to be locked to the shaft as by a pin 193 or the like. With this construction, it will be seen that on release of the split nut 187 from the threaded shaft 166 and on turning of the hand wheel 192 while locked to the shaft 191, the gear 190 will be turned and travelling along the rack 189, the entire dressing mechanism will be fed longitudinally of the bridge.

A pair of uprights 194 extending upwardly from the bridge 162 serve to mount an L-shaped member 195 on the lower side and toward the ends of which are mounted a pair of limit switches 196 and 197 having handles 198 and 199, respectively. Fixed to the inverted L-shaped suspension piece 177 and extending upwardly therefrom is a T-shaped member 200, the head of which is at such elevation as to engage switch handle 198 or switch handle 199 at the limit of movement of the dressing mechanism 18 in either direction.

With the described construction, a cushioning sleeve 134 having been placed on the mandrel and the latter having been expanded, the operator will locate the key 184 at the proper place in the way in the underside of the bracket 180 and then tighten the locking screws 185. This will place the grinding wheel 23 approximately in contact with the expanded cushioning sleeve. Then the dressing device being at one end of the machine, as toward the head of the machine (toward the left in Fig. 2), the operator may start the motor 22 and also the motor 170 and manipulate the hand wheel 182 to feed the bracket 180 inwardly carrying the grinding wheel 23 against the cushioning sleeve which is being rotated by the mandrel.

The feed screw 166 will cause the dressing mechanism to be fed lengthwise along this cushioning sleeve and the latter will be dressed or ground off removing its high places and rounding its flats to form it into a true cylinder. It may be necessary to pass the grinding wheel several times over the sleeve in order to obtain a real cylinder and therefore, when the feed screw has fed the mechanism to its outermost position (its extreme position toward the left looking at the back of the machine as in Fig. 2), the member 200 will engage the switch handle 198 and operate a reversing starter to the motor 170.

Now the dressing mechanism is given a reverse movement and the grinding wheel 23 carried back across the work. At the end of this reverse movement, member 200 engages switch handle 199 again causing reversal of motor 170 whereby the grinding wheel 23 is carried back across the work in the direction first described. In this way the dressing or grinding wheel may be passed over the cushioning sleeve the desired number of times until said sleeve is formed into a perfect cylinder of the desired diameter. When the sleeve is dressed, the motor 170 is stopped and the operator releases split nut structure 187 by manipulating hand piece 188 and turns hand wheel 192 to feed the dressing mechanism back to its starting position. Thereafter, pin 193 is released and split nut 187 re-engaged with the feed screw.

This dressing wheel is advanced against the cushioning sleeve by manipulation of the hand wheel 182 for the dressing operation and may be drawn back from engagement with the sleeve for the return movement of the dressing mechanism by the hand wheel 192. The adjustment provided by the key 184 and the way in the lower end of the bracket 180 is only necessary when different sizes of mandrels and thus different diameters of cushioning sleeves are employed and to avoid the necessity for any major adjustment by manipulation of the hand wheel 182.

On the upper end of the gear housing 11 is a second and smaller gear housing 201 while on the upper end of the vertical end frame member 12 and in a position opposite said gear housing 201 is a cross head 202, the latter being secured in place as by bolts 203. This cross head 202 has a pair of openings 204 and 205 of relatively large diameter for the reception of supporting and guide bars to be identified, and a pair of smaller openings 206 and 207 for receiving the ends of a cam shaft and a shift rod, respectively, and a bearing 208 for the reception or mounting of the outer end of a feed screw also to be identified.

Within the bearing 29, a bevelled gear 209 is fast to the shaft 28 and meshes with a second bevelled gear 210 fixed to the inner end of a vertically inclined shaft 211 which, through a shaft section 212 and a pair of universal couplings 213 and 214, is connected to drive a shaft 215 entering a gear casing 216 at the outer side of the upper gear casing 201 previously referred to. Fixed to shaft 215 is a worm 217 meshing with a worm gear 218 fast on a shaft 219 extending through the gear housing 201 and at the inner side of the latter connected as through a coupling 220 with a cam shaft 221, which latter extends for the length of the machine and has its outer end mounted in the opening or bearing 206 of the cross head 202.

Fast on the shaft 219 is a roller carrying driving element 222 for intermittently engaging the star wheel 223 of a Geneva movement. Such wheel 223 is fast on a shaft 224 along with a relatively large gear 225. Gear 25 meshes with a gear 226 on a stub shaft 227, which shaft at the outer side of the casing or housing 201 is adapted to drive a second stub shaft 228 through a pair of meshing gears 229 and 230. Within the housing 201, shaft 228 has fixed to it a clutch element 231. Shaft 228 is aligned with the inner end of a shaft 232, which latter is a feed screw and turnable on the shaft 232 within the housing 201 is a gear 233. However, the gear 233 is adapted to be coupled with the shaft by clutch means 234.

A shiftable clutch element 235 is adapted for movement by a yoke 236 fixed to a shaft 237 extending to the outer forward side of the housing 201 and there provided with a hand lever or manual 238. During operation of the machine in the cutting of belts from a piece of stock, clutch element 235 is coupled with clutch element 231 whereby through the above described Geneva movement, intermittent movement is imparted to the feed screw 232 while the cam shaft 221 is constantly rotated, it being coupled or connected by the means 220 with the shaft 219.

At the end of a cutting operation, means are provided for returning the cutting mechanisms to their starting position adjacent the outer end of the mandrel. Such means or rapid traverse includes the motor 21 which through pulleys 239 and belts 240 drives pulleys 241 fixed to a short shaft 242 entering the housing 201 and there equipped with a gear 243 which constantly meshes with the gear 233. At the end of a cutting operation, the motor 21 is energized and through the described mechanism drives the gear 233 and thus the feed screw 232 in a direction reverse to its direction of operation so as to return the cutters to starting position with a continuous rather than an intermittent movement. At this time, the clutch element 235 will be uncoupled from the clutch element 231 so that the latter will be turning freely and will not oppose this reverse movement of the feed screw 232.

A pair of relatively large diameter supporting and guiding bars 244 and 245 are mounted parallel with one another and parallel with the feed screw 232 and the cam shaft 221. Bar 244 is supported at its inner end from a wall of the gear housing 201 and at its outer end in the opening 204 of the cross head 202, while the bar 245 at its inner end is supported from a bracket 246 on the rear wall of the housing 201 and at its outer end in the opening 205 of said cross head.

A shifter rod 247 has its outer end passing through the opening 207 in the cross head and at its inner end this rod passes through guides 248 and between them is fixed to an operating lever 249 which, through a member 250, is attached to an extension of the shaft or bar 237 above described as operable by the lever 238 for manipulating the clutch operating yoke 236.

The guide bars 244 and 245 serve to mount and to guide movement of a carrier and operating mechanism generally designated 251, shown enlarged in Figs. 13 and 14. The carrier comprises a pair of cross members 252 and 253 having cylindrical or eye structures 254 at their ends and slidable on the bars 244 and 245. Then a plate 255 has corner ears lying against and secured to web portions of the cross members 252 and 253 and rigidly secured to the latter as by screws or the like 256. The feed screw 232 passes through tubular enlargements 257 in the webs of the members 252 and 253 and also passes through a pair of nuts 258 and 259 supported from the plate 255 and located at the underside of the latter. Nut 258 is rigidly held to the plate while nut 259 is adjustable in the direction of the length of the feed screw on tightening of the nuts 260 on threaded shanks 261 fast with said nuts 259. This is to insure against any end play in the feed screw relative to the carrier 251.

Extending through a pair of vertical enlargements 262 and 263 of the webs of the members 252 and 253 are a pair of vertical posts 264 and 265 provided on their forward faces with rack teeth 266 and 267, respectively. A shaft 268 is arranged somewhat diagonally at the upper side of the carrier 251 and at its respective ends has gears 269 and 270 meshing with the respective racks 266 and 267. Fixed to said shaft 268 is a worm wheel 271 with which meshes a worm 272 on a shaft 273 equipped at its forward end with a relatively large hand wheel 274. With this construction, it will be seen that on turning of the hand wheel 274, the posts 264 and 265 will be moved vertically upwardly or downwardly depending upon the direction in which the hand wheel is turned.

These posts, at their lower ends, support the cutter mechanisms 20, as will be described, and they are adjustable vertically as above set forth in order to locate such cutter mechanism in the proper position, vertically, with respect to work of different diameters. Following a vertical adjustment of these parts, they are locked in adjusted position by the tightening of screws 275 passing through split portions 276 at the undersides of the enlargement 262 and 263. A trip member 277 is provided on one edge of plate 255 to ride along and impart, at the proper times, movements to the shifter bar 247.

Mounted by the carrier 251, for vertical movement relative thereto and also for movement in the direction of the guide bars 244 and 245 with such carrier, is a frame 278 comprising side plates 279 connected by a bolt 280 mounting a roller or wheel 281 between said side plates. At their lower ends, these side plates are connected by a part 282 to which is secured a depending rod 283, the purpose of which will appear. The cam shaft 221 passes through the frame 278 and while this shaft is continuously rotated as above described, it is provided with a longitudinally extending keyway 284 through which a cam 285 is connected to such shaft for rotation therewith.

Clearly, the cam is slidable along the shaft as it will be understood that this cam moves with the carrier 251 when the latter is fed inwardly and outwardly along the guide bars 244 and 245 by the feed screw 232. Cam 285 is part of an assembly including a roller 286 and a disc or plate 287, the edges of the latter being received in grooves provided in the opposing faces of arms 288 of a yoke member 289 secured to the forward end of the piston rod of a cylinder and piston construction 290.

On fluid under pressure being supplied to the outer end of the cylinder 291, the piston 292 is moved forwardly in the cylinder and operating through the yoke 289 and the disc 287 forces the cam 285 from beneath the roller 281 and brings the roller 286 to a position beneath the roller 281. The roller 281 now rests on the roller 286 but up and down movement will not be imparted to the roller 281 and thus through the frame 278 to the rod 283. However, it will be understood that when the roller 281 is on the cam 285, as the cam rotates, the roller 281 is moved upwardly and downwardly imparting the same movement to the frame 278 and thus to the rod 283. Now on fluid under pressure being supplied to the inner end of the cylinder 291, the piston 292 will be blown back to its outer position and the cam 285 brought under the cam roller 281.

The first above described shifting of the cam, or operation of the cam knockout structure, occurs at the end of a cutting operation when the carrier is at the inner end of its movement. The supplying of fluid to the cylinder 291 is under the control of a four-way valve 293 adapted to be operated by a short shaft 294 connected by a universal coupling 295 with the inner end of shaft or rod 296 having a bearing at 297 and at its outer end provided with a hand lever 298 for manual manipulation. Also, rigid with the short shaft 294 is an arm carrying a roller 299 adapted to engage a dog 304 at the inner end of movement of the carrier 251.

On the roller engaging this dog, the valve 293 is operated to supply fluid to the outer end of the cylinder 292 knocking out the cam as above described and stopping further reciprocating movements of the rod 283. Also, as this occurs, a lateral extension 301 on an arm of the yoke 289 engages a roller 302 and operates a switch 303 preparing a circuit for the energizing of the motor 21 on the manual closing of a second switch (not shown) whereby to set said motor in operation, clutch element 235 having been shifted by manual 238, and through the rapid traverse means above described, and including the gear 243, continuously turn the feed screw 232 in a direction opposite to that in which it has been intermittently turned whereby to shift the entire carrier 251 and the cutter units supported therefrom back to starting position.

At the starting position, the roller 299 will engage a second dog 300 reversing the valve 293 supplying fluid to the inner end of the cylinder 291 whereby yoke 289 is drawn back to operating position shifting cam 285 to a position under the roller 281 and also releasing the switch 303 so that the latter may open thereby providing a safety feature preventing casual closing of the circuit of motor 21 on operation of the mentioned second switch. The dogs 300 and 304 are mounted on the underside of the bar 305 whose only purpose is to support these dogs. While the operation of knocking out the cam and setting in motion the rapid traverse feature of the invention has been described as taking place automatically under control of the dogs 300 and 304 which will be properly located on the bar 305, depending upon the length of mandrel being employed, it will be understood that the valve 293 may be manually operated. This will be through manipulation of hand lever 298 whereby the yoke 289 will be operated to stop vertical reciprocation of the rod 283 and also to close the switch 303.

Fixed on the lower ends of posts 264 and 265 is a mounting structure 306 including a rigid sectionally cross-shaped body portion 307 and at the outer ends of such body portion a pair of tubular portions 308 and 309 are fixed to the posts 264 and 265 as by set screws or pins 310. A pair of plates 311 and 312 supported by the body structure 307 support a bracket arm 313 at its upper end having a bolt 314 passing through a slot 315 in a lever element 316. At its inner end, element 316 is pivoted at 317 to the upper end of a plunger or rod 318, which latter at its lower end carries a foot piece 319. The rod 283 which is to be reciprocated by the cam 285 as above described, is clamped as at 320 to one end of the lever 316 whereby on reciprocation of said rod 283 said lever 316 will be rocked on the pivot 314. This will cause up and down movements of the plunger 318 and thus of the foot plate 319 rigid with the lower end of said plunger.

The motors 26 and 27 drive the cutters 24 and 25, respectively, and the structures mounting these motors are duplicates of one another although arranged in a reverse relation and so a description of one of these structures will, it is believed, suffice for both, the same identification numerals being applied to the corresponding parts in the two structures.

For the mounting of the motor 26, there is provided at the outer side of the cylindrical portion 308 a dovetail piece or mounting plate 321 received in ways in a plate 322, a gib structure 323 being provided. Integral with the plate 322 is a plate 324 angularly related to the plate 321 and provided with a dovetailed groove or way 325 having a gib 326 at one side. In the way 325 there is received a dovetail block 327 adjustable in the way on manipulation of a screw 328. Rigid with the block 327 is a second block 329 having a dovetail way 330 therein and receiving a dovetail block 331 adjustable on the ways 330 on manipulation of a screw 332.

A screw 333 is provided for adjusting the plate 322 and parts carried thereby along guide block 321. A bolt or stud 334 pivotally mounts a heavy plate 335 on the block 321 for adjustment with said block and for pivotal movement relative thereto. Also, this plate at its rear side carries upper and lower pivot studs 336 and 337 aligned with one another and pivotally mounting the motor 26. Thus, the motor 26 is mounted for turning movement on the stud 334 and also for pivotal movement on the aligned pins or studs 336 and 337 and, of course, for adjustment with the slide 331 and, together with the latter, for adjustment with the slide 327 and for adjustment with the latter as the slide or plate 322 is adjusted.

The cutter 24 is mounted on the inner end of the shaft of the motor 26 and such shaft passes through a sleeve 338 on which is clamped a harness 339. The latter includes a pair of spaced plates 340 and 341, a bar 342 pivoted to the lower side of plate 341 and a bolt and nut structure 343 adapted on being tightened to clamp the harness 339 on the sleeve 338 and locate the plates 340 and 341. Plate 341 may be secured to the harness structure by bolts or the like and bearing on the upper edges of the plate 341 of the harness structure associated with each motor is the foot 319.

Therefore, on raising of the rod 283, the plunger 318 is depressed, its foot 319 pressing downwardly on the plates 341 causes rocking movements of the motors 26 and 27 so as to carry the cutters 24 and 25 against any work 137 on the mandrel for the cutting of such work. Then, as the high point of the cam moves from under the roller 281 and the rod 283 is lowered, the plunger 318 is drawn upwardly with its foot 319 and at such times a coil spring 344 anchored at its lower end to a part of the motor and its upper end to a bolt 345, on a bracket 346, rocks the motor again on the stud 344 lifting the cutter 24 away from the work. It will be understood that during all of this time said motor is rotating said cutter at high speed.

The posts or bars 264 and 265 are adjusted vertically to properly locate the cutters with respect to different diameters of work that the machine may be called upon to cut. However, such adjustment will not necessarily give the best cutting conditions and we have provided means for laterally adjusting the cutters with respect to one another by rocking of the motors on the pair of pivot studs 336 and 337. This means includes a bar 347 carried by a slide 348 and extending downwardly into a position between the plates 340 and 341. Such slide 348 is adjustable on the turning of a screw 349 so as to shift the bar 342 and thereby rock the motor on the axis represented by the pins 336 and 337 and thus to shift the cutter from or toward the vertical center of the mandrel and of any work mounted thereon. As a convenience for manipulation of the screw 349, its outer end 350 may be squared or otherwise shaped for the reception of a tool. While the actual cutters may be secured to the motor shafts in any desired way, in the drawings we have shown them as secured in place by washers 351 and nuts 352.

While it is the general plan that the machine be entirely automatic in its operation, it being merely necessary that the operator remove cut work from a sleeve on a mandrel and apply a new piece of stock to the mandrel and then operate clutch lever 238, it will be understood that others of the controls may be manual instead of automatic. We have provided a manual means for stopping the operation of the machine at any time should an emergency arise. To this end, a sleeve 353 is located on an extension of the shaft 55 above referred to and is adjustable along such extension to apply or release a brake mechanism 354. Sleeve 353 is fixed to a harness structure 355 pivoted at its upper end at 356 and connected with the sleeve for sliding the latter but so as not to interfere with rotation of the latter. Below the sleeve 353 the harness is pivoted at 357 with the outer end of the rod 358 of a cylinder and piston construction including a cylinder 360 and a piston 359. Tubes or pipes 361 and 362 are provided for conveying fluid under pressure to the outer and inner ends of the cylinder 360 and the supply of fluid to these parts is under control of a valve 363 having a manual 364 located at the front of the machine.

Should an emergency arise, the operator manipulates the valve 363 to exhaust fluid under pressure from the outer end of the cylinder 359 and to supply fluid under pressure to the inner end of such cylinder under the piston 359 forcing the same outwardly to thereby rock the harness 355 and shift the sleeve 353 to cause operation of the brake mechanism 354. Since this brake is now operating on the main drive shaft 55, which is integral with tubular shaft 67 entering the drive head 13, it will be clear that the mandrel will be brought to a stop, clutches 45 and 60 being disengaged. This structure may be used in the normal operation to bring the mandrel to a stop at the end of a cutting operation and while the rapid traverse is in use returning the carrier 251 and the cutter assemblies to starting position.

To operate the present machine, assuming the mandrel to be collapsed and that there is no cushioning sleeve on the mandrel, the operator first withdraws the tail stock center 15 and then operates the valve 152 to supply fluid under pressure to the cylinders 151 to withdraw the bolts 154 from the sockets 153. Then another valve (not shown) is manipulated to supply fluid under pressure to the upper end of the cylinder 155 whereby to cause swinging of the tail stock body 144 on its pivot 147 from the full to the broken line position of Fig. 12. This exposes the tail stock end of the mandrel leaving such end completely unsupported.

Now the operator slips a cushioning sleeve 134 over the collapsed mandrel from the tail stock end of the latter. Power being supplied through the coupling 19, the clutches 45 and 60 are shifted in the manner described above for expansion of the mandrel and braking action on head 78 is applied through manipulation of the lever 127 and the mandrel expanded in accordance with the setting of the stop 101. When the mandrel is collapsed, the longitudinal edges of its segments 109 are close together. However, when it is expanded, such edges of its segments are circumferentially spaced and the cushioning sleeve being forcefully engaged by these segments, flats appear on the outer surface of the sleeve at the places between the mandrel segments.

This new cushioning sleeve is now to be dressed to a perfect cylinder. For this dressing operation, the tail stock 16 should be shifted back to operating position (the full line position of Fig. 12) and now the dressing means 18 is employed. During the dressing operation, the mandrel is rotated from shaft 28 through the substantially straight line drive described above, that is, from gear 34 on shaft 28 directly to gear 58 coupled to shaft 55 by the clutch element 59 and brake band 118 is released, being so held by spring 130.

Dressing mechanism 18 is in its retracted position at the head end of the machine and the operator now starts the motor 22 and the key 184 of the latter being fixed in proper position in the way at the underside of bracket 180, hand wheel 182 is operated to feed the bracket 180 to proper position engaging the grinding wheel 23 with the cushioning sleeve. Split nut means 187 is engaged with the feed screw 166 and motor 170 is started to feed the dressing mechanism along the bridge structure 162 with the revolving dressing wheel 23 engaging the rotating sleeve on the mandrel.

At the end of a pass in one direction, limit switch 196 is operated through its handle 198 reversing motor 170 (through the above mentioned reversing starter) and the grinding wheel is carried back across the work. Then at the limit of this reverse movement, switch 197 is operated through its handle 199 again reversing the direction of travel of the dressing mechanism. For manually returning the dressing mechanism to a desired position, split nut means 187 is dis-engaged from the feed screw 166 and the hand wheel 192 is locked to its shaft and rotated to turn the gear 190 meshing with the rack 189 and feed the dressing mechanism back to starting position. A number of passes of the dressing mechanism over the new cushioning sleeve may be required to reduce it to a true cylinder on the expanded mandrel, however, only the minimum of stock is removed in reducing the sleeve to a true cylinder, free of longitudinally extending flats. When the sleeve is dressed the motors 22 and 170 are stopped and the bracket 180 is fed out to remove the grinding wheel 23 from the sleeve.

Now, by proper setting of the clutches 45 and 60 and use of the brake 118, the mandrel is collapsed and then the tail stock 16 is swung to open or inoperative position. Here it is noted that the key 135 on a mandrel segment maintains the sleeve properly located, and in the same location, on the mandrel when it is collapsed and again expanded. A cylinder of work is slipped over the dressed cushioning sleeve, the tail stock is swung back to and locked in operating position, and the tail stock center 15 advanced to working position.

The machine is now ready to cut this new cylinder of work into belts. Posts 264 and 265 are adjusted to have the rotary cutters 24 and 25 clear the work when the springs 344 are maintaining the motors 26 and 27 in their upper positions about the studs 334. Further, the slides 348 have been adjusted to have the cutters 24 and 25 in the proper relation at the opposite sides of the vertical center of the work cylinder. At the start of the machine cycle, the carrier 251 and cutting assemblies supported therefrom are at the inner or head of the machine.

To start the machine cycle, clutch element 235 is shifted from its neutral position to the rapid traverse position and the motor 21 through pulleys 239 and 241 and belts 240, clutch 234 and gears 243 and 233 drives the feed screw 232 continuously and in a reverse direction returning carrier 251 and the cutter assemblies or units to starting position at the tail stock end of the mandrel.

At the end of this return movement, roller 299 strikes dog 300 and valve 293 is again shifted whereby fluid under pressure is supplied to the inner end of cylinder 291 and the yoke 289 is moved in the opposite direction. This releases switch 303 so that the motor 21 of the rapid traverse is de-energized, and cam 285 is again drawn under the roller 281. Also, at the end of this movement, guide 277 strikes the collar A and shifter rod 247 is moved longitudinally in the opposite direction recoupling clutch elements 235 and 231 so the machine is ready for the indexing or cutting operation.

To start the cutting operation, motors 26 and 27 are energized to drive the cutters 24 and 25 and while clutch 45 is left in a neutral position, clutch 60 is manipulated to couple gear 58 with the shaft 55 and thus establish the above described substantially straight line drive to the mandrel 17. The spring 130 at this time maintaining the brake 118 in off position. Under the described conditions, not only is the mandrel 17 rotated but the lead screw 232 is being intermittently driven while the cam shaft 221 is continuously rotated.

Cam 285 is timed with the intermittent feed of the carrier 251 and parts supported therefrom and at the end of each intermittent feed of the carrier, the cam operates to depress the foot 319 on plunger 318 and the motors 26 and 27 are rocked on the studs 334 against the tendency of the springs 344, pressing the cutters 24 and 25 against and through the revolving work to cut a belt therefrom. With the three slides 332, 327 and 331 of each cutter assembly, the motors 26 and 27 and thus cutters 24 and 25 may be shifted toward or from one another (longitudinally of the mandrel) to determine the thickness of the belts that are cut; they may be adjusted into different lateral relationships for best locations when cutting from different diameters of stock; and may be adjusted vertically for cutting through different thicknesses of stock.

At the end of a cutting operation, roller 299 engages dog 300 manipulating the valve 293 to supply fluid under pressure to the outer end of cylinder 291 and shift the yoke 289 inwardly. This carries the cam 285 from under the cam roller 281 so that the push rod 283 stays in its lower position and the cutters 24 and 25 stay in their upper positions being located just above the work. Further, at this time, the switch 303 is closed to again make possible the energizing of the rapid traverse motor 21 and the shifter rod 247 is moved longitudinally due to engagement of guide 277 with a collar B on such shifter rod, disconnecting the clutch element 235 stopping the carrier at its orignal starting position at the head end of the machine.

Now, the operator uses clutches 45 and 60 and brake 118 to bring about collapse of the mandrel 17, causes the tailstock 16 to be swung to open to inoperative position and removes the cut belts from the cushioning sleeve. A new piece of stock is placed over the cushioning device, the tail stock moved back to position and the mandrel again expanded and the above described operation of cutting belts is repeated. As pointed out above, the key 135 on the mandrel segment 109 and the slot or way 136 in the sleeve insures constant relation between the mandrel and sleeve so that the same portions of the latter always engage the same portions of the cushioning sleeve. Various interlocking safety switches and solenoids may be included in the machine and it is noted that at the end of a cutting operation, the cutters are at the head portion of the machine and away from the tail stock end of the mandrel, over which tail stock end the operator removes cut belts and applies new stock to be cut.

Having thus set forth the nature of our invention, what we claim is:

1. In a belt cutting machine, an expansible and collapsible mandrel, means mounting said mandrel for rotation about its longitudinal axis, power means for rotating said mandrel, a resilient cushioning sleeve positioned on said mandrel, said mandrel with said cushioning sleeve being adapted to have a cylinder of belt stock placed thereover, means for expanding said mandrel against said cushioning sleeve thereby expanding said sleeve against the cylinder of belt stock, means for dressing the expanded sleeve to a true externally cylindrical shape prior to the positioning thereon of said belt stock, a cutter, means for indexing said cutter along said mandrel, and means to move the cutter toward the mandrel to cut belt stock positioned on said sleeve and to then move the cutter back clear of said stock for the next indexing operation.

2. In a belt cutting machine, an expansible and collapsible mandrel, means mounting said mandrel for rotation about its longitudinal axis, power means for rotating said mandrel, said mandrel adapted to have a cushioning sleeve placed thereon and a cylinder of stock placed over said sleeve, said mandrel comprising a series of bar-like segments whereby when the mandrel is expanded with said sleeve thereon said bars are circumferentially spaced and said sleeve has flats in its portions between said segments, means for dressing said expanded sleeve to a true externally cylindrical shape, a cutter, means for indexing said cutter along said mandrel, and means to move the cutter toward the mandrel to cut stock on said sleeve and to then move the cutter back clear of said stock for the next indexing operation.

3. In a belt cutting machine, a horizontal work supporting mandrel, means for rotating said mandrel with a cylinder of work thereon to be cut into belts, supporting and guide bars above and substantially parallel with said mandrel, a carrier on said bars, a pair of posts supported by and movable with and vertically adjustable relative to said carrier, a body on said posts below said carrier, a pair of cutter assemblies on said body and of identical construction but arranged oppositely, each of said assemblies including a motor and a disc-like cutter on the shaft of said motor, a support mounting said motor for pivotal movement about a vertically inclined axis, means to adjust the motor about said axis and secure it against further movement about said axis, a horizontally adjustable slide adjustable substantially in the direction of the length of said mandrel, a stud mounting said motor on said slide for movement about a substantially horizontal axis, a cam actuated foot to move said motor in one direction about said substantially horizontal axis to move said cutter against work on said mandrel, a spring for moving said motor in the opposite direction on its release by said foot, a screw for moving said slide, a second slide movable in a substantially vertical plane and mounting the first mentioned slide, a screw for adjusting the second slide, a third slide mounting the second slide and adjustable in a substantially horizontal plane but in a direction substantially at right angles to the plane of adjustment of the first mentioned slide, and a screw for adjusting said third slide.

4. In a machine for cutting belts, a cutter assembly comprising a motor and a disc-like cutter on the shaft of said motor, a support pivotally mounting said motor for pivotal movement about a vertically inclined axis, means to adjust the motor about said axis and secure it against further movement about said axis, a horizontally adjustable slide, a stud mounting said motor on said slide for movement about a substantially horizontal axis, a cam actuated foot to move said motor in one direction about said substantially horizontal axis to move said cutter against work on a mandrel, a spring for moving said motor in the opposite direction on its release by said foot, a screw for moving said slide, a second slide movable in a substantially vertical plane and mounting the first mentioned slide, a screw for adjusting the second slide, a third slide mounting the second slide and adjustable in a substantially horizontal plane but in a direction substantially at right angles to the plane of adjustment of the first mentioned slide, and a screw for adjusting said third slide.

5. In a cutter assembly for a belt cutting machine, a motor and a disc-like cutter on the shaft of said motor for rotation therewith, a support on which said motor is mounted, a horizontally adjustable slide, a stud mounting said support on said slide for rocking movement about a horizontal axis, a second slide vertically inclined and mounting the first mentioned slide, and a third slide horizontally adjustable at right angles to the plane in which the first mentioned slide is adjustable and mounting the second mentioned slide.

6. In a belt cutting machine, a mandrel mounted for turning movement about a horizontal axis and means for rotating said mandrel, a carrier above and movable in the direction of the length of said mandrel, a cutter assembly supported from said carrier and located above and adapted to cut work on said mandrel, said cutter assembly comprising a motor and a disc-like cutter on the shaft of said motor for movement therewith and rotation thereby, a support on which said motor is mounted, a slide horizontally adjustable in the direction of the length of said mandrel and parallel therewith, a stud mounting said support on said slide for rocking movement about a horizontal axis to rock said motor and move said cutter toward and from said mandrel to cut work thereon, a second slide adjustable at a vertical incline extending toward a point above the vertical center of said mandrel and mounting the first mentioned slide, and a third slide mounting the second slide and horizontally adjustable in a direction transverse of said mandrel.

7. A machine as in claim 6 including means on said support and providing an axis substantially parallel with the path along which the second slide is adjustable, said motor mounted on said means for adjustment about said axis, and another slide independent of the other three mentioned slides and adjustable to shift said motor on said axis and operable to prevent movement of the motor about said axis while said support is rocking on said stud.

8. In a belt cutting machine, a mandrel mounted for rotation about a horizontal axis, a carrier above and movable in the direction of the length of said mandrel, a cutter assembly supported from said carrier and located above and adapted to cut work on said mandrel, said cutter assembly comprising a motor and a disc-like cutter driven by the shaft of said motor and mounted for movement therewith and for rotation thereby, a support mounting said motor, a stud mounting said support for rocking of said motor about a horizontal axis to carry said cutter toward and from the mandrel to cut work thereon, and means mounting said stud for adjustments to shift said support and thereby said motor and cutter longitudinally, transversely vertically and transversely horizontally of said mandrel.

9. In a belt cutting machine, a mandrel mounted for rotation about a horizontal axis, a carrier above and movable in the direction of the length of said mandrel, a cutter assembly supported from said carrier and located above and adapted to cut work on said mandrel, said cutter assembly comprising a motor and a disc-like cutter on the shaft of said motor for movement therewith and for rotation thereby, a support mounting said motor, a stud mounting said support for rocking of said motor about a horizontal axis to carry said cutter toward and from the mandrel to cut work thereon, and means mounting said stud for independent adjustments to shift said support and thereby said motor and cutter longitudinally, transversely vertically and transversely horizontally of said mandrel.

10. In a belt cutting machine, a mandrel mounted for rotation about a horizontal axis, a carrier above and movable in the direction of the length of said mandrel, a cutter assembly supported from said carrier and located above and adapted to cut work on said mandrel, said cutter assembly comprising a motor and a disc-like cutter on the shaft of said motor for movement therewith and for rotation thereby, a support mounting said motor, a stud mounting said support for rocking of said motor about a horizontal axis to carry said cutter toward and from the mandrel to cut work thereon, means mounting said stud for adjustments to shift said support and thereby said motor and cutter longitudinally, transversely vertically and transversely horizontally of said mandrel, means on said support and providing a vertically inclined axis inclining toward a point above the vertical axis of said mandrel, said motor mounted on said means for adjustment about said axis, and a manually adjustable means adjustable to shift said motor on said axis to properly locate said cutter for cutting engagement with work on said mandrel and then operable to prevent movement of the motor about said axis while said support is rocking on said stud.

11. In a belt cutting machine, a horizontal work supporting mandrel, means for rotating said mandrel with a cylinder of work stock thereon to be cut into belts, a carrier, guide bars mounting said carrier above said mandrel for movement back and forth in the direction of the length of the latter, cutters supported from said carrier and movable to and from cutting engagement with work on said mandrel, a feed screw extending parallel with said bars and having threaded engagement with said carrier for feeding the latter on said bars, means for intermittently rotating said screw in one direction to intermittently feed said carrier in one direction along said bars, a cam shaft parallel with said feed screw, a cam on and rotatable with said shaft and slidable therealong with said carrier, means for continuously rotating said cam shaft and thus said cam, means operated by said cam for moving said cutters into engagement with work on said mandrel between such intermittent feeds of the carrier, spring means normally maintaining said cutters spaced from work on said mandrel and adapted to return the cutters to such spaced relation when the latter are moved therefrom and released, and means operable at the end of the feed of the carrier in the direction of such intermittent feed to shift said cam and render it inoperative to move said cutters whereby said spring means maintains the cutters spaced from work on the mandrel and to also disconnect said intermittent drive from the feed screw and set into operation means to continuously rotate said screw in the opposite direction to return said carrier and cutters to starting position.

12. In a belt cutting machine, a horizontal work supporting mandrel, means for rotating said mandrel with a cylinder of work stock thereon to be cut into belts, a carrier, guide bars mounting said carrier above said mandrel for movement back and forth in the direction of the length of the latter, cutters supported from said carrier and movable to and from cutting engagement with work on said mandrel, a feed screw extending parallel with said bars and having threaded engagement with said carrier for feeding the latter on said bars, means for intermittently rotating said screw in one direction to intermittently feed said carrier in one direction along said bars, a cam shaft parallel with said feed screw, a cam on and rotatable with said shaft and slidable therealong with said carrier, means for continuously rotating said cam shaft and thus said cam, means operated by said cam for moving said cutters into engagement with work on said mandrel between such intermittent feeds of the carrier, spring means normally maintaining said cutters spaced from work on said mandrel and adapted to return the cutters to such spaced relation when the latter are moved therefrom and released, means operable at the end of the feed of the carrier in the direction of such intermittent feed to shift said cam and render it inoperative to move said cutters whereby said spring means maintains the cutters spaced from work on the mandrel and to also disconnect said intermittent drive from the feed screw and set into operation means to continuously rotate said screw in the opposite direction to return said carrier and cutters to starting position, said means operable at the end of the feed of the carrier in the direction of such intermittent feed including a fluid pressure operated means, a valve controlling the supply of fluid under pressure to said means, and means movable with said carrier for tripping said valve.

13. In a belt cutting machine, a horizontal work supporting mandrel, means for rotating said mandrel with a cylinder of work stock thereon to be cut into belts, a carrier, guide bars mounting said carrier above said mandrel for movement back and forth in the direction of the length of the latter, cutters supported from said carrier and movable to and from cutting engagement with work on said mandrel, a feed screw extending parallel with said bars and having threaded engagement with said carrier for feeding the latter on said bars, means for intermittently rotating said screw in one direction to intermittently feed said carrier in one direction along said bars, a cam shaft parallel with said feed screw, a cam on and rotatable with said shaft and slidable therealong with said carrier, means for continuously rotating said cam shaft and thus said cam, means operated by said cam for moving said cutters into engagement with work on said mandrel between such intermittent feeds of the carrier, spring means normally maintaining said cutters spaced from work on said mandrel and adapted to return the cutters to such spaced relation when the latter are moved therefrom and released, means operable at the end of the feed of the carrier in the direction of such intermittent feed to shift said cam and render it inoperative to move said cutters whereby said spring means maintains the cutters spaced from work on the mandrel and to also disconnect said intermittent drive from the feed screw and set into operation means to continuously rotate said screw in the opposite direction to return said carrier and cutters to starting position, said last means including a fluid pressure operated means, a valve controlling the supply of fluid under pressure to said means, means movable with said carrier for tripping said valve at the end of movement of the carrier in each direction, and means whereby on the tripping of said valve at the end of the return movement of said carrier said cam is shifted back to operative position and said continuous drive of the feed screw is disconnected therefrom and the intermittent drive thereof is reconnected.

14. In a belt cutting machine, an expansible and collapsible mandrel, means mounting said mandrel for rotation about its longitudinal axis, power means for rotating said mandrel, said mandrel adapted to have a cushioning sleeve placed thereon and a cylinder of stock placed over said sleeve, said mandrel comprising a series of bar-like segments whereby when the mandrel is expanded with said sleeve thereon said bars are circumferentially spaced and said sleeve has flats in its portions between said segments, means for dressing said expanded sleeve to a true externally cylindrical shape, a cutter, means for indexing said cutter along said mandrel, means to move the cutter toward the mandrel to cut stock on said sleeve and to then move the cutter back clear of said stock for the next indexing operation, said means for dressing said sleeve comprising a bridge structure at one side of and extending longitudinally of said mandrel, a mounting plate on said bridge structure and movable longitudinally therealong, a slide on said mounting plate and adjustable relative thereto in a direction transverse of said mandrel, manual means for so adjusting said slide, a bracket on said slide, a dressing unit on said bracket and comprising a grinding wheel and a motor for rotating the same, and means for feeding said mounting plate longitudinally of said bridge and for thus moving said dressing unit along a sleeve on said mandrel.

15. In a belt cutting machine, an expansible and collapsible mandrel, means mounting said mandrel for rotation about its longitudinal axis, power means for rotating said mandrel, said mandrel adapted to have a cushioning sleeve placed thereon and a cylinder of stock placed over said sleeve, said mandrel comprising a series of bar-like segments whereby when the mandrel is expanded with said sleeve thereon said bars are circumferentially spaced and said sleeve has flats in its portions between said segments, means for dressing said expanded sleeve to a true externally cylindrical shape, a cutter, means for indexing said cutter along said mandrel, means to move the cutter toward the mandrel to cut stock on said sleeve and to then move the cutter back clear of said stock for the next indexing operation, said means for dressing said sleeve comprising a bridge structure at one side of and extending longitudinally of said mandrel, a mounting plate on said bridge structure and movable longitudinally therealong, a slide on said mounting plate and adjustable relative thereto in a direction transverse of said mandrel, manual means for so adjusting said slide, a bracket on said slide, a dressing unit on said bracket and comprising a grinding wheel and a motor for rotating the same, means including a feed screw for moving said mounting plate in one direction along said bridge and thus moving said dressing unit along a sleeve on said mandrel, means for disconnecting said feed screw from driving relation with said plate, and manually operable means including a rack and pinion structure for moving said mounting plate in the opposite direction along said bridge structure to return said dressing unit to starting position.

16. In a belt cutting machine, an expansible and collapsible mandrel, means mounting said mandrel for rotation about its longitudinal axis, power means for rotating said mandrel, said mandrel adapted to have a cushioning sleeve placed thereon and a cylinder of stock placed over said sleeve, said mandrel comprising a series of bar-like segments whereby when the mandrel is expanded with said sleeve thereon said bars are circumferentially spaced and said sleeve has flats in its portions between said segments, means for dressing said expanded sleeve to a true externally cyclindrical shape, a cutter, means for indexing said cutter along said mandrel, means to alternately move the cutter toward and from the mandrel to cut stock on said sleeve and then to move back clear of said stock for the next indexing operation, a fluid pressure operated brake means associated with a shaft of said power means, and manually operable means operable at will for supplying fluid pressure to said means to apply said brake.

17. In a belt cutting machine, a horizontal work supporting mandrel, means for rotating said mandrel with a cylinder of work stock thereon to be cut into belts, a carrier, supporting and guide means mounting said carrier above said mandrel for movement back and forth in the direction of the length of the latter, cutters supported from said carrier and movable to and from cutting engagement with work on said mandrel, a feed screw for feeding said carrier on said supporting and guide means, means for intermittently rotating said screw in one direction to intermittently feed said carrier in one direction along said supporting and guide means, means for moving said cutters into engagement with work on said mandrel between said intermittent feeds of said carrier, means for then moving said cutters from the mandrel to a position outwardly of work on the mandrel, means operable at the end of the feed of said carrier in the direction of such intermittent feed and while said cutters are outwardly of work on said mandrel to rotate said feed screw continuously in the opposite direction to return said carrier and cutters to starting position, a fluid pressure operated brake means associated with the drive shaft of said power means, and manually operable means operable at will for supplying fluid pressure to said brake means to apply said brake.

18. In a belt cutting machine, an expansible and collapsible mandrel, means mounting said mandrel for rotation about its longitudinal axis, power means for rotating said mandrel, said mandrel adapted to have a cushioning sleeve placed thereon and a cylinder of stock placed over said sleeve, said mandrel comprising a series of bar-like segments whereby when the mandrel is expanded with said sleeve thereon said bars are circumferentially spaced and said sleeve has flats in its portions between said segments, means for dressing said expanded sleeve to a true externally cylindrical shape, interlocking means between said sleeve and a segment of said mandrel whereby said sleeve and mandrel remain in the same relation to one another on re-expansion of said mandrel following collapse thereof, a cutter, means for indexing said cutter along said mandrel, and means to alternately move the cutter toward and from the mandrel to cut stock on said sleeve and then to move back clear of said stock for the next indexing operation.

19. In a belt cutting machine, an expansible and collapsible mandrel, means mounting said mandrel for rotation about its longitudinal axis, power means for rotating said mandrel, said mandrel adapted to have a cushioning sleeve placed thereon and a cylinder of stock placed over said sleeve, said mandrel comprising a series of bar-like segments whereby when the mandrel is expanded with said sleeve thereon said bars are circumferentially spaced and said sleeve has flats in its portions between said segments, means for dressing said expanded sleeve to a true externally cylindrical shape, a long key on the outer side of a segment of said mandrel and extending longitudinally thereof and rigid therewith, said sleeve having a longitudinally extending groove in the inner surface thereof and receiving said key whereby said mandrel and sleeve retain the identical relationship to one another on re-expansion of the mandrel following collapse thereof, a cutter, means for indexing said cutter along said mandrel, and means to alternately move the cutter toward and from the mandrel to cut stock on said sleeve and then to move back clear of said stock for the next indexing operation.

20. In a belt cutting machine, an expansible and collapsible mandrel, means mounting said mandrel for rotation about its longitudinal axis, power means for rotating said mandrel, said mandrel adapted to have a cushioning sleeve placed thereon and a cylinder of stock placed over said sleeve, said mandrel comprising a series of bar-like segments whereby when the mandrel is expanded with said sleeve thereon said bars are circumferentially spaced and said sleeve has flats in its portions between said segments, each of said segments transversely curved on its outer surface with each of said curves comprising an arc of the same circle whereby in the expanded condition of the mandrel the sleeve portion directly supported by the segments all have the same outer contour, means for dressing said expanded sleeve to a true externally cylindrical shape, a cutter, means for indexing said cutter along said mandrel, and means to alternately move the cutter toward and from the mandrel to cut stock on said sleeve and then to move back clear of said stock for the next indexing operation.

21. In a belt cutting machine, a head stock, a work supporting mandrel supported from one end by and driven by said head stock, said machine including an upright laterally of and at the outer end of said mandrel, a tail stock pivoted on one side of said upright and swingable from an operative position having its center concentric with the outer end of said mandrel to a position clearing the outer end of said mandrel, and said tail stock including an arcuate surface portion which in the last described position of the tail stock is below and concentric with the mandrel and forms a support on which work may be disposed and then pushed off such surface and onto the mandrel over the outer end of the latter.

22. In a belt cutting machine, a work supporting mandrel, means for rotating said mandrel with a cylinder of work stock thereon to be cut into belts, a carrier, supporting and guide means mounting said carrier in spaced relation to said mandrel for movement back and forth in the direction of the length of the mandrel, cutters supported from said carrier and movable to and from cutting engagement with work on said mandrel, a feed screw for feeding said carrier on said supporting and guide means, means for intermittently rotating said screw in one direction to intermittently feed said carrier in one direction along said supporting and guide means, means for moving said cutters into engagement with work on said mandrel between said intermittent feeds of said carrier, means for moving said cutters from the mandrel to a position spaced outwardly of work on the mandrel, and means operable at the end of the feed of the carrier in the direction of such intermittent feed and while said cutters are spaced outwardly of work on the mandrel to rotate said feed screw continuously in the opposite direction to return said carrier and cutters to starting position.

23. In a belt cutting machine, a work supporting mandrel, means for rotating said mandrel with a cylinder of work thereon to be cut into belts, supporting and guide means in spaced substantially parallel relation with said mandrel, a carrier on said guide means, a pair of posts supported by and movable with said carrier and adjustable relative thereto toward and from said mandrel, a body on said post inwardly of said carrier, a pair of cutter assemblies on said body and of identical construction but arranged oppositely, each of said assemblies including a motor and a shaft mounted disc-like cutter driven by said motor, a support mounting said shaft for pivotal movement about an inclined axis, means to adjust said shaft about said axis and secure it against further movement about said axis, a slide adjustable substantially in the direction of the length of said mandrel, a stud mounting said cutter supporting shaft on said slide for movement about an axis substantially normal to the axis of said mandrel, a cam actuated foot to move said cutter mounting shaft in one direction about said stud to move said cutter against work on said mandrel, a spring for moving said cutter mounting shaft in the opposite direction on its release by said foot, a screw for moving said slide, a second slide movable in a plane substantially normal to the plane of movement of the first slide and mounting the first slide, a screw for adjusting the second slide, a third slide mounting the second slide and adjustable in a plane substantially at right angles to the plane of adjustment of the first mentioned slide, and a screw for adjusting said third slide.

24. In a machine for cutting belts, a cutter assembly comprising a motor and a disc-like cutter on the shaft of said motor, a support pivotally mounting said motor for pivotal movement about an inclined axis, means to adjust the motor about said axis and secure it against further movement thereabout, an adjustable slide, a stud mounting said motor on said slide for pivotal movement, a cam actuated foot to move said motor in one direction about said stud to move said cutter against work on a mandrel, a spring for moving said motor in the opposite direction on its release by said foot, a screw for moving said slide, a second slide movable in a plane substantially normal to that in which the first mentioned slide is adjustable and mounting said first mentioned slide, a screw for adjusting the second slide, a third slide mounting the second slide and adjustable in a direction substantially at right angles to the plane of adjustment of the first mentioned slide, and a screw for adjusting said third slide.

25. In a cutter assembly for a belt cutting machine, a motor and a disc-like cutter on the shaft of said motor for rotation therewith, a support on which said motor is mounted, an adjustable slide, a stud mounting said support on said slide for rocking movement, a second slide adjustable substantially at right angles to the direction of adjustment of the first mentioned slide and inclined and mounting the first mentioned slide, and a third slide adjustable in the plane of adjustment of the first mentioned slide and at right angles to the direction in which the first mentioned slide is adjustable and mounting the second mentioned slide.

26. In a belt cutting machine, a mandrel mounted for rotation, a carrier spaced from and movable in the direction of the length of said mandrel, a cutter assembly supported from said carrier and located between the latter and said mandrel and adapted to cut work on said mandrel, said cutter assembly comprising a motor, a shaft driven by said motor and a disc-like cutter on said shaft for movement therewith and for rotation thereby, a support mounting said shaft, a stud mounting said support for rocking of said shaft about an axis to carry said cutter toward and from the mandrel to cut work thereon, and means mounting said stud for adjustments to shift said support and thereby said shaft and cutter longitudinally of said mandrel and transversely thereof in two directions substantially normal to one another.

27. In a belt cutting machine, a work supporting mandrel, means for rotating said mandrel with a cylinder of work stock thereon to be cut into belts, a carrier, guide means mounting said carrier in spaced relation to said mandrel for movement back and forth in the direction of the length of the latter, cutters supported from said carrier and movable to and from cutting engagement with work on said mandrel, a feed screw extending parallel with said guide means and having threaded engagement with said carrier for feeding the latter along said guide means, means for intermittently rotating said screw in one direction to intermittently feed said carrier in one direction along said guide means, a cam shaft parallel with said feed screw, a cam on and rotatable with said shaft and slidable therealong with said carrier, means for continuously rotating said cam shaft and thus said cam, means operated by said cam for moving said cutters into engagement with work on said mandrel between such intermittent feeds of the carrier, spring means normally maintaining said cutters spaced from work on said mandrel and adapted to return the cutters to such spaced relation when the latter are moved therefrom and released, and means operable at the end of feed of the carrier in the direction of such intermittent feed to shift said cam and render it inoperative to move said cutters whereby said spring means maintains the cutters spaced from work on the mandrel and to also disconnect said intermittent drive from the feed screw and set into operation means to continuously rotate said screw in the opposite direction to return said carrier and cutters to starting position.

28. In a belt cutting machine, an expansible and collapsible mandrel, means mounting said mandrel for rotation about its longitudinal axis, power means for rotating said mandrel, said mandrel adapted to have a cushioning sleeve placed thereon and the cylinder of stock placed over said sleeve, said mandrel comprising a series of bar-like segments whereby when the mandrel is expanded with said sleeve thereon said bars are circumferentially spaced and said sleeve has flats in its portions between said segments, means for dressing said expanded sleeve to a true externally cylindrical shape, a cutter, means for indexing said cutter along said mandrel, means to move the cutter toward the mandrel to cut stock on said sleeve and to then move the cutter back clear of said stock for the next indexing operation, said means for dressing said sleeve comprising a bridge structure located in spaced relation to and extending longitudinally of said mandrel, mounting means on said bridge structure and movable longitudinally therealong, a slide on said mounting means and adjustable relative thereto in directions transverse of said mandrel, manual means for so adjusting said slide, a bracket on said slide, a dressing unit on said bracket and comprising a grinding wheel and a motor for rotating the same, means mounting said dressing unit on said bracket for adjustment in directions transversely toward and from said mandrel and for locking the dressing unit to the bracket in adjusted relation thereto, and means for feeding said mounting means longitudinally of said bridge and for thus moving said dressing unit along a sleeve on said mandrel.

29. In a belt cutting machine, an expansible and collapsible mandrel, means mounting said mandrel for rotation about its longitudinal axis, power means for rotating said mandrel, said mandrel adapted to have a cushioning sleeve placed thereon and a cylinder of stock placed over said sleeve, said mandrel comprising a series of bar-like segments whereby when the mandrel is expanded with said sleeve thereon said bars are circumferentially spaced and said sleeve has flats in its portions between said segments, a dressing unit for dressing said expanded sleeve to a true externally cylindrical shape, said dressing unit comprising a grinding wheel and a motor for rotating the same, a cutter, means for indexing said cutter along said mandrel, and means to move the cutter toward the mandrel to cut stock on said sleeve and to then move the cutter back clear of the stock for the next indexing operation.

30. In a belt cutting machine, an expansible and collapsible mandrel, means mounting said mandrel for rotation about its longitudinal axis, power means for rotating said mandrel, said mandrel adapted to have a cushioning sleeve placed thereon and a cylinder of stock placed over said sleeve, said mandrel comprising a series of bar-like segments whereby when the mandrel is expanded with said said sleeve thereon said bars are circumferentially spaced and said sleeve has flats in its portions between said segments, a dressing unit comprising a grinding wheel and a motor for rotating the same for dressing said expanded sleeve to a true externally cylindrical shape, manually operable means for moving said unit toward and from a sleeve on said mandrel, other means for moving said dressing unit back and forth longitudinally of a sleeve on said mandrel, a cutter, means for indexing said cutter along said mandrel, and means to move the cutter toward the mandrel to cut stock on said sleeve and to then move the cutter back clear of said stock for the next indexing operation.

31. In a belt cutting machine, an expansible and collapsible mandrel, means mounting said mandrel for rotation about its longitudinal axis, power means for rotating said mandrel, said mandrel adapted to have a cushioning sleeve placed thereon and a cylinder of stock placed over said sleeve, said mandrel comprising a series of bar-like segments whereby when the mandrel is expanded with said sleeve thereon said bars are circumferentially spaced and said sleeve has flats in its portions between said bars, a dressing unit comprising a grinding wheel and a motor for rotating the same for dressing said expanded sleeve to a true externally cylindrical shape, means mounting said dressing unit at one side of said mandrel for movement toward and from the mandrel and for movement longitudinally of the latter, a cutter at a side of the mandrel spaced from that side at which said dressing unit is located, means for indexing said cutter along said mandrel, and means to move the cutter toward the mandrel to cut stock on said sleeve and to then move the cutter back clear of said stock for the next indexing operation.

EDMUND J. LOMAZZO.
LLOYD E. MAQUAT.

References Cited in the file of this patent

UNITED STATES PATENTS

| Number | Name | Date |
| --- | --- | --- |
| 1,592,923 | Hammond et al. | July 20, 1926 |
| 1,647,358 | Hubbard | Nov. 1, 1927 |
| 1,721,905 | Hammond | July 23, 1929 |
| 1,944,255 | McFall | Jan. 23, 1934 |
| 2,206,262 | Ott | July 2, 1940 |
| 2,405,637 | Behrens | Aug. 13, 1946 |
| 2,499,562 | Behrens | Mar. 7, 1950 |